(12) United States Patent
Kamijima et al.

(10) Patent No.: US 8,094,523 B2
(45) Date of Patent: Jan. 10, 2012

(54) HEAT-ASSISTED MAGNETIC RECORDING MEDIUM AND MAGNETIC RECORDING APPARATUS WITH THE MEDIUM

(75) Inventors: Akifumi Kamijima, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 583 days.

(21) Appl. No.: 12/234,250

(22) Filed: Sep. 19, 2008

(65) Prior Publication Data

US 2010/0074062 A1    Mar. 25, 2010

(51) Int. Cl.
*G11B 11/00* (2006.01)

(52) U.S. Cl. .............. 369/13.33; 369/13.13; 360/59

(58) Field of Classification Search .......... 369/13.33, 369/13.32, 13.13, 112.09, 112.14, 112.21, 369/112.27, 13.38, 13.39, 13.4; 428/817, 428/818, 819.4, 827, 828; 360/59; 385/129
See application file for complete search history.

(56) References Cited

U.S. PATENT DOCUMENTS

| | | | |
|---|---|---|---|
| 6,226,258 B1 | 5/2001 | Tominaga et al. | |
| 6,411,591 B1* | 6/2002 | Moritani et al. | 369/275.2 |
| 6,661,745 B1* | 12/2003 | Tominaga et al. | 369/13.33 |
| 6,741,549 B2 | 5/2004 | Tominaga et al. | |
| 2003/0218969 A1* | 11/2003 | Tsai et al. | 369/288 |
| 2004/0081031 A1 | 4/2004 | Saga et al. | |
| 2006/0233060 A1 | 10/2006 | Mizutani et al. | |
| 2008/0153037 A1* | 6/2008 | Shibata | 430/290 |

FOREIGN PATENT DOCUMENTS

| | | |
|---|---|---|
| JP | 04-212734 | 8/1992 |
| JP | 2000-195036 | 7/2000 |
| JP | 2002-117549 | 4/2002 |
| JP | 2007-193906 | 8/2007 |
| JP | 2007-335027 | 12/2007 |

* cited by examiner

*Primary Examiner* — Tan X Dinh
(74) *Attorney, Agent, or Firm* — Frommer Lawrence & Haug LLP

(57) ABSTRACT

Provided is a magnetic recording medium that generates near-field light within itself and enables favorable heat-assisted magnetic recording with this near-field light. The medium comprises: a magnetic recording layer; and an optically changeable layer formed on the opposite side to a substrate relative to the magnetic recording layer, the optically changeable layer being made transparent or a refractive index of the layer being changed when irradiated by light with an intensity not less than a predetermined intensity. By the irradiation, a minute opening or a refractive-index-changed area is formed within the irradiated portion on the optically changeable layer. The light irradiation onto the minute opening or the refractive-index-changed area enables near-field light to be generated, which heats a portion of the magnetic recording layer. Thus, the anisotropic field of the portion is lowered to a writable value, which enables heat-assisted magnetic recording by applying write field.

6 Claims, 14 Drawing Sheets

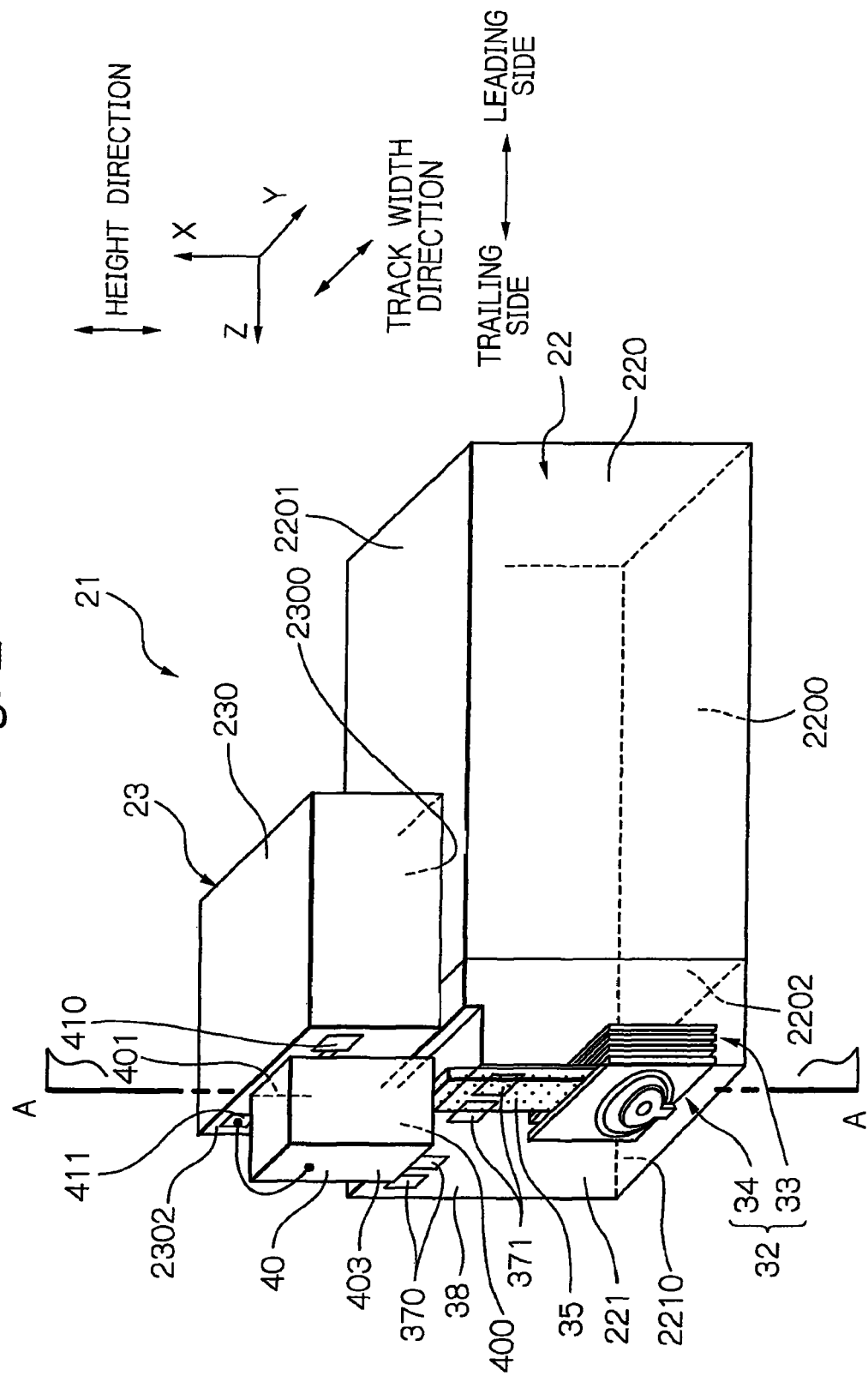

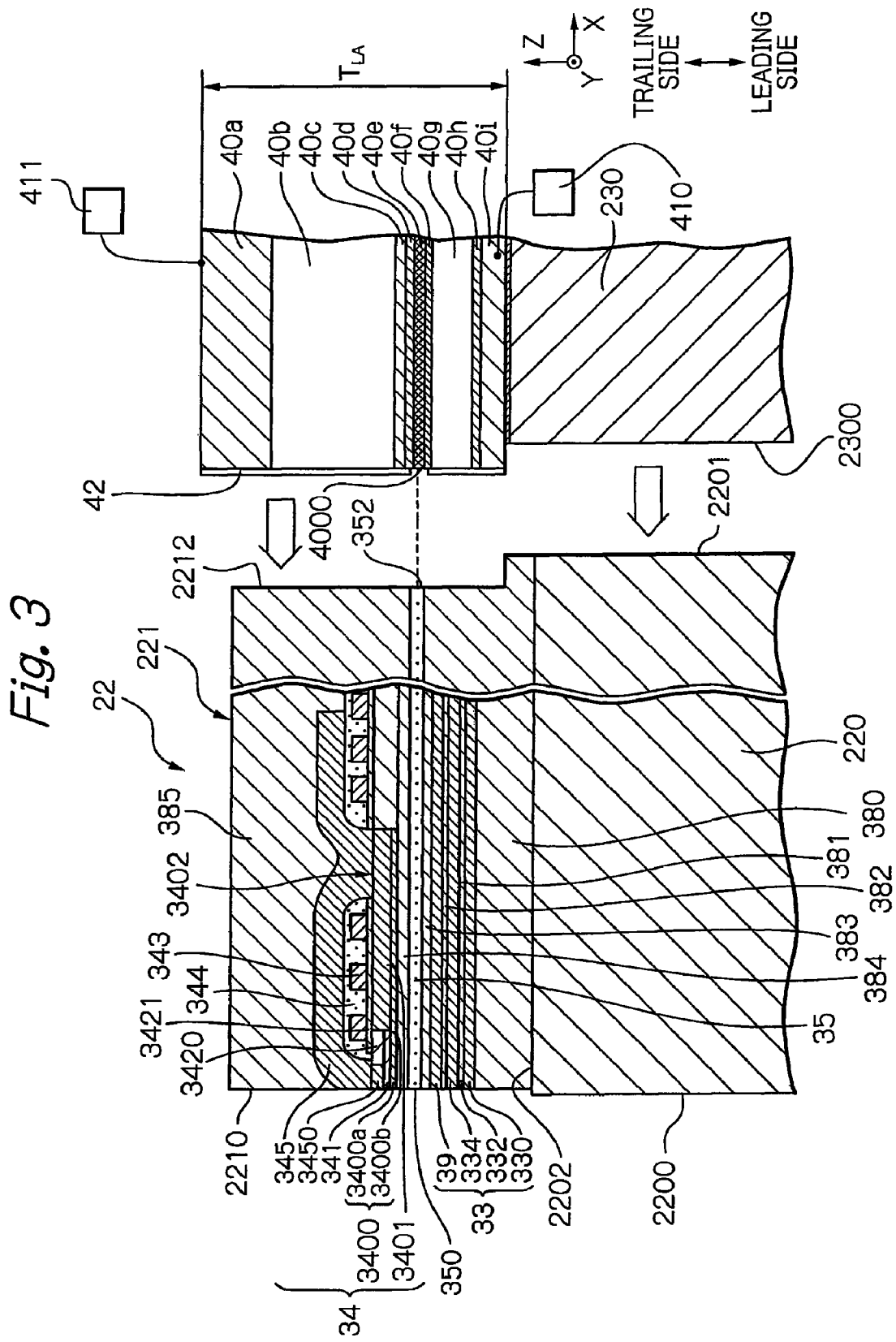

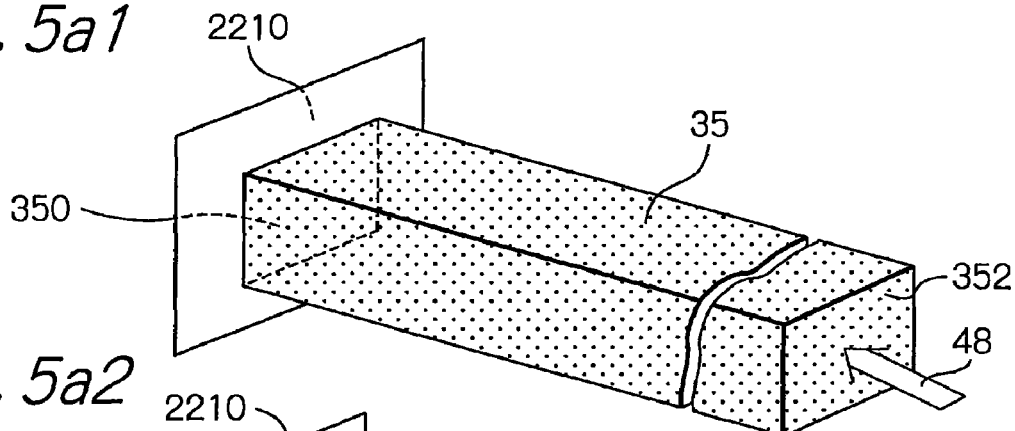
Fig. 5a1
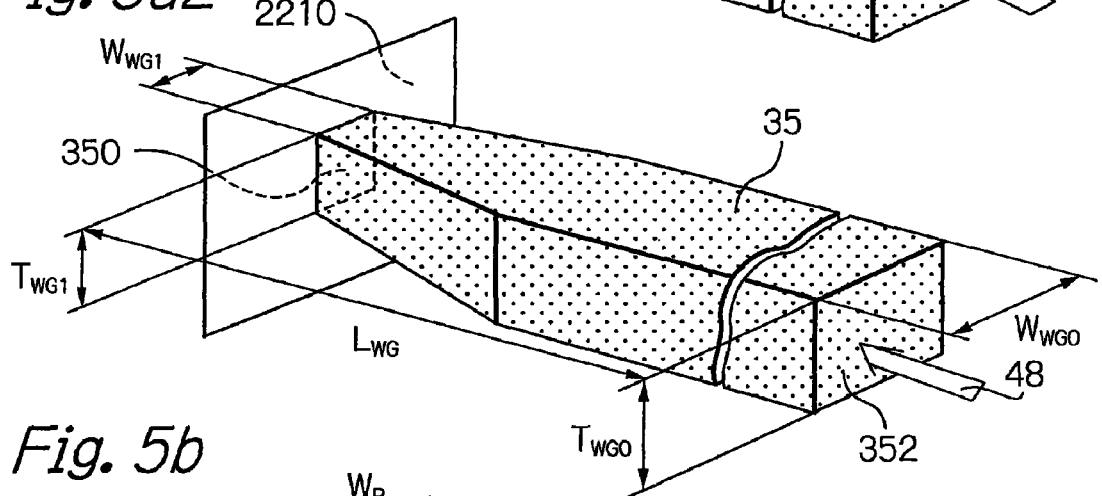
Fig. 5a2
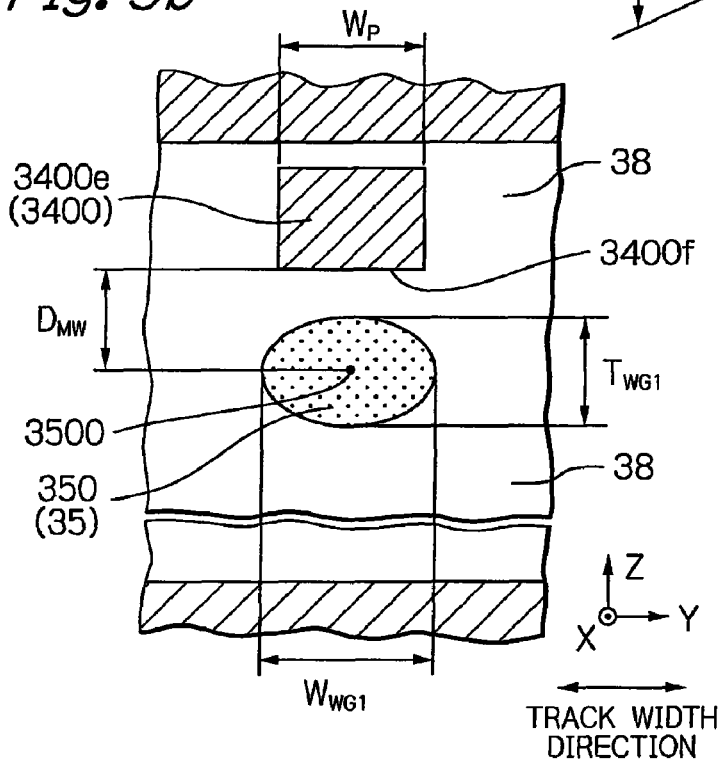
Fig. 5b
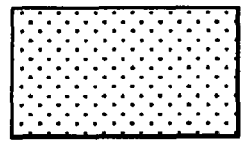
Fig. 5c1
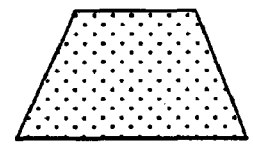
Fig. 5c2
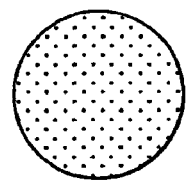
Fig. 5c3

# HEAT-ASSISTED MAGNETIC RECORDING MEDIUM AND MAGNETIC RECORDING APPARATUS WITH THE MEDIUM

BACKGROUND OF THE INVENTION

1. Field of the Invention

The present invention relates to a magnetic recording medium for use in heat-assisted magnetic recording in which writing is performed while the magnetic recording medium is heated to reduce its anisotropic magnetic field, and further to a magnetic recording apparatus provided with such a magnetic recording medium.

2. Description of the Related Art

As the recording density of a magnetic recording apparatus, such as a magnetic disk apparatus, becomes higher, further improvement has been required in the performance of a thin-film magnetic head and a magnetic recording medium. As the thin-film magnetic head, a composite-type thin-film magnetic head is widely used, which has a stacked structure of a magnetoresistive (MR) element for reading data and an electromagnetic transducer for writing data.

On the other hand, the magnetic recording medium is generally a kind of discontinuous body of magnetic microparticles gathered together. Here, one record bit consists of a plurality of the magnetic microparticles. Therefore, in order to improve the recording density, it is necessary to decrease the size of the magnetic microparticles and reduce irregularity in the boundary of the record bit. However, the decrease in size of the magnetic microparticles raises a problem of degradation of thermal stability of magnetization due to decrease in volume.

As a countermeasure to this problem, it is conceivable to increase the magnetic anisotropy energy $K_U$ of the magnetic microparticle. However, this increase of $K_U$ causes the increase in anisotropic magnetic field (coercive force) of the magnetic recording medium. On the other hand, the upper limit of write-field intensity by the thin-film magnetic head is virtually determined by the saturation magnetic flux density of soft magnetic material constructing a magnetic core in the head. Therefore, the writing data becomes impossible if the anisotropic magnetic field of the magnetic recording medium exceeds a permissible value determined by the upper limit of write-field intensity.

As a method of solving this problem of thermal stability, so-called a heat-assisted magnetic recording technique is proposed, in which writing is performed by reducing the anisotropic magnetic field with heat supplied to the magnetic recording medium formed of magnetic material with large $K_U$ just before application of the write field. For the heat-assisted magnetic recording technique, such a method is a mainstream as disclosed in US Patent Publication No. 2004/081031 A1. The method includes providing an optical system within a thin-film magnetic head, and irradiating near-field light from the thin-film magnetic head on the magnetic recording medium.

However, a problem arises when providing an optical system for generating the near-field light within a thin-film magnetic head as described above, in that it is not easy to form each optical part and also considerably difficult to generate desired near-field light stably in the formed optical system.

Actually, an element for generating the near-field light has to be formed within the head while locating on a opposed-to-medium surface, while it is difficult to provide a light source, such as a laser diode, near the opposed-to-medium surface. Accordingly, when the light source is provided at a position separated apart from the opposed-to-medium surface, a waveguide is necessitated to efficiently propagate the light from the light source to the near-field light generating element. Here, the near-field light generating element, the waveguide and the light source have to have respective sufficient performances, and relative positional accuracy between the optical system and a write head element is required to be high enough. Hence, it has been worried that the yield of manufacturing thin-film magnetic heads may be lowered because it is very difficult to form an optical system having such sufficient performance.

SUMMARY OF THE INVENTION

Therefore, an object of the present invention is to provide a magnetic recording apparatus in which a necessary optical system can be easily formed within a head and favorable heat-assisted magnetic recording using near-field light can be achieved. Another object of the present invention is to provide a magnetic recording medium that generates near-field light within itself and enables favorable heat-assisted magnetic recording by using this near-field light.

A further object of the present invention is to provide a magnetic recording medium having improved recording density, and yet still another object of the present invention is to provide a magnetic recording apparatus capable of implementing heat-assisted magnetic recording with improved recording density.

Some terms used in the specification will be defined before explaining the present invention. In a layered structure or an element structure formed on an element-formed surface of a slider substrate in a thin-film magnetic head according to the present invention, when viewed from a standard layer or element, a substrate side is defined as "lower" side, and the opposite side as an "upper" side. In a certain layer or element, a portion of a substrate side is defined as a "lower portion", and a portion of the opposite side as an "upper portion". In embodiments of the thin-film magnetic head according to the present invention, "X-, Y- and Z-axis directions" are indicated in some figures as needed. Here, Z-axis direction indicates above-described "up-and-low" direction, and +Z direction corresponds to a trailing side and −Z direction to a leading side. Y-axis direction indicates a track width direction, and X-axis direction indicates a height direction.

According to the present invention, a magnetic recording medium is provided, which comprises: a magnetic recording layer formed over a layer-stacked surface of a substrate; and at least one optically changeable layer formed on a side opposite to the substrate relative to the magnetic recording layer, the at least one optically changeable layer being made transparent or a refractive index of the at least one optically changeable layer being changed when irradiated by light with an intensity not less than a predetermined intensity. When the light irradiates the optically changeable layer in the above-described magnetic recording medium from the head, a minute opening or a refractive-index-changed area is formed within the irradiated portion on the optically changeable layer. The irradiation of the light onto the minute opening or the refractive-index-changed area enables near-field light to be generated, and the near-field light heats a portion of the magnetic recording layer, the portion below the opening or the area. As a result, the anisotropic magnetic field (coercive force) of the portion of the magnetic recording layer is lowered to a writable value. By applying write field to the portion of the magnetic recording layer, the heat-assisted magnetic recording can be performed. Thus, the magnetic recording medium according to the present invention enables the near-field light to be generated in its own inside, without mounting of a complicated optical system in the head, to thereby achieve favorable heat-assisted magnetic recording.

In the magnetic recording medium according to the present invention, the at least one optically changeable layer preferably has a surface contact with the magnetic recording layer, or is preferably located adjacent to the magnetic recording layer through a nonmagnetic layer. Further, a plurality of the optically changeable layers is preferably stacked in surface contact with each other or stacked with at least one pair of the layers sandwiching a nonmagnetic layer therebetween. Furthermore, the at least one optically changeable layer is preferably formed of antimony (Sb), alloy including Sb, lithium niobate ($LiNbO_3$), or methyl-2-nitroaniline, which are made transparent when the layer is irradiated by light with an intensity not less than a predetermined intensity; or the at least one optically changeable layer is preferably formed of antimony oxide, silver oxide, or terbium oxide, a refractive index of each of which changes when the layer is irradiated by light with an intensity not less than a predetermined intensity. Here, as the alloy including Sb, there can be employed SbGeTe alloy, SbAgTnTe alloy, SbInTeV alloy, etc.

Further, in the magnetic recording medium according to the present invention, the at least one optically changeable layer and/or the magnetic recording layer are preferably patterned so as to have the form of patterns separated apart from each other in a track width direction. As described above, the use of the discrete track medium as the magnetic recording medium according to the present invention can contribute to achievement of much higher track density and linear recording density.

According to the present invention, a magnetic recording apparatus is further provided, which comprises: at least one magnetic recording medium; and at least one thin-film magnetic head for writing data in the at least one magnetic recording medium, the magnetic recording medium comprising: a magnetic recording layer formed over a layer-stacked surface of a substrate; and at least one optically changeable layer formed on a side opposite to the substrate relative to the magnetic recording layer, the at least one optically changeable layer being made transparent or a refractive index of the at least one optically changeable layer being changed when irradiated by light with an intensity not less than a predetermined intensity, the thin-film magnetic head comprising: a write head element comprising a magnetic pole for generating write field for writing data; and a waveguide for guiding light to said at least one optically changeable layer, and a light source for supplying light to the waveguide, provided in the thin-film magnetic head or within the magnetic recording apparatus.

The above-described magnetic recording apparatus is not necessitated to have, within the thin-film magnetic head, a complicated and precise optical system for generating the near-field light. That is, the apparatus has the magnetic recording medium that can generate the near-field light in its own inside, and therefore can achieve a favorable heat-assisted magnetic recording using the near-field light, even when using a head having a necessary optical system formed with relative ease.

In the magnetic recording apparatus according to the present invention, a light-exit end surface of the waveguide, which is opposed to the magnetic recording medium, is preferably located at a leading side of an end surface, which is opposed to the magnetic recording medium, of the magnetic pole, and is preferably located adjacent to the end surface of the magnetic pole. Further, a smallest diameter or width of the light-exit end surface, which is opposed to the magnetic recording medium, of the waveguide can be set to be larger than a wavelength of the light propagating through the waveguide. With this structure, it is possible to avoid difficult fine processes on the order of less than the wavelength of the light in forming the waveguide. This can contribute to improvement of the yield for manufacturing heads.

Further, in the magnetic recording apparatus according to the present invention, it is preferable that: a part of the optically changeable layer is made transparent or a refractive index of the part is changed with irradiation of the light emitted from the light-exit end surface, which is opposed to the magnetic recording medium, of the waveguide; near-field light generated from the part irradiates the magnetic recording layer; thus, an anisotropic magnetic field of a portion on the magnetic recording layer is lowered to a writable value; and a width in the track width direction of the lowered portion is equal to or more than a width in the track width direction, on the magnetic recording layer, of an applied area of write field generated from the magnetic pole and having enough intensity to write onto the magnetic recording layer. According to this setting, a magnetic dominant recording can be achieved in the track width direction, independently of the recording method in the direction along track. Further, it is preferable that a relative position between a spot center on the light-exit end surface, which is opposed to the magnetic recording medium, of the waveguide and an end surface, which is opposed to the magnetic recording medium, of the magnetic pole, and a shape and size of the light-exit end surface are set so that, with respect to a recording method to the magnetic recording layer, an optical dominant recording is performed in a direction along track and a magnetic dominant recording is performed in a track width direction. In this case, the light-exit end surface, which is opposed to the magnetic recording medium, of the waveguide preferably has an ellipsoid shape with a longer axis in the track width direction.

Hereinafter, embodiments of the present invention will be described in detail with reference to the accompanying figures. In the figures, the same elements are designated with the same reference numerals, and dimensional proportions both in a structural element and between structural elements in the drawings are arbitrary for easy viewing of the figures.

BRIEF DESCRIPTION OF THE DRAWINGS

FIG. 2 shows a perspective view illustrating one embodiment of the thin-film magnetic head according to the present invention;

FIG. 3 shows a cross-sectional view taken by plane A of FIG. 2, schematically illustrating a structure of a major part in the embodiment of the thin-film magnetic head shown in FIG. 2;

FIGS. 5a1 and 5a2 show perspective views illustrating two embodiments of the waveguide;

FIGS. 5b to 5c3 show plain views illustrating the shapes of the ends of the electromagnetic transducer and the waveguide on the head end surface;

DESCRIPTION OF THE PREFERRED EMBODIMENTS

Figure 1:
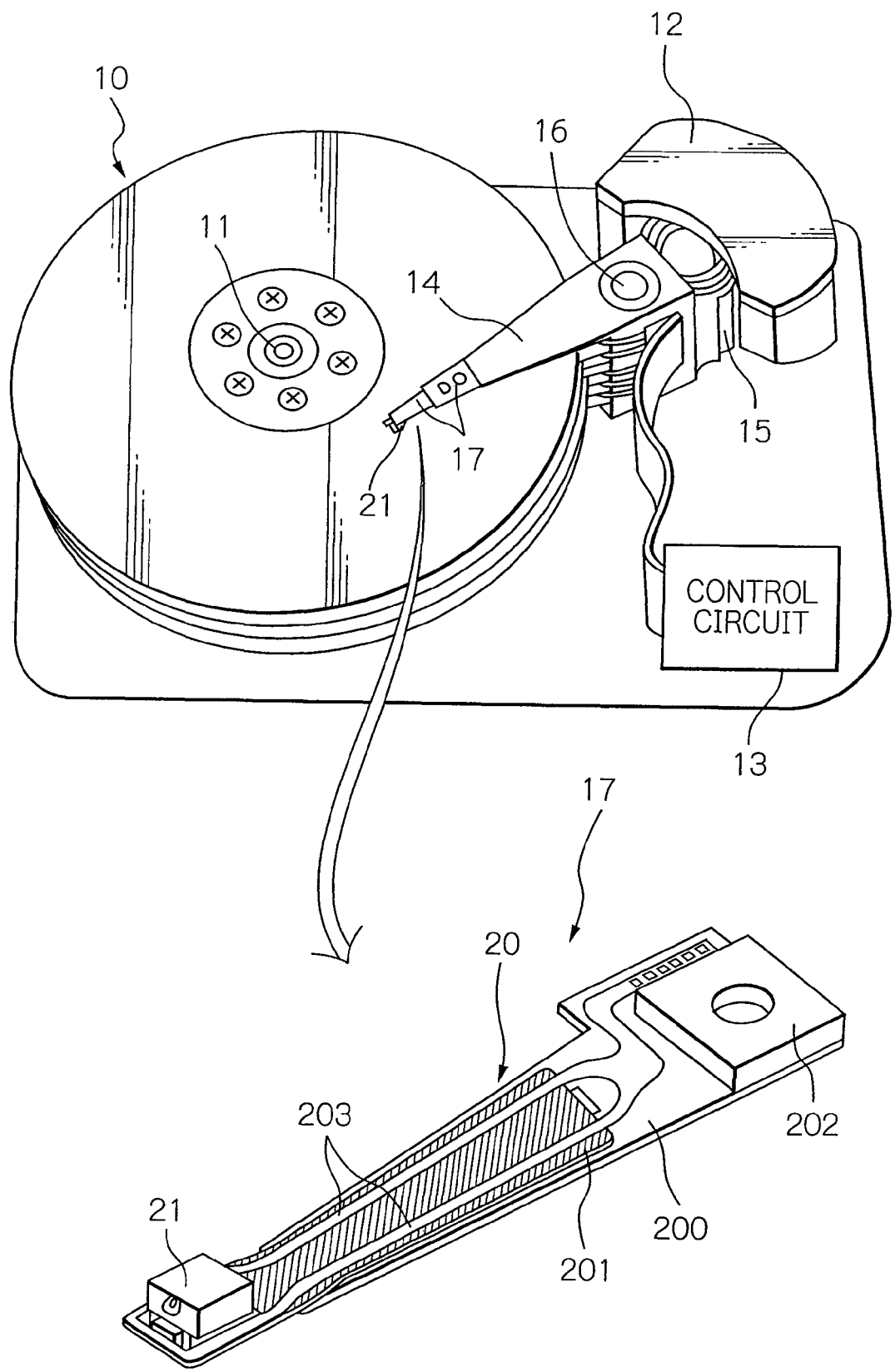
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. In the perspective view of the HGA, a side facing the surface of a magnetic recording medium is shown upward.

A magnetic disk apparatus as the magnetic recording apparatus shown in FIG. 1 includes: a plurality of magnetic disks 10 as magnetic recording media rotating around a rotational axis of a spindle motor 11; an assembly carriage device 12 provided with a plurality of drive arms 14 thereon; a head gimbal assembly (HGA) 17 mounted at the top end portion of each drive arm 14 and provided with a thin-film magnetic head 21; and a recording/reproducing control circuit 13 for controlling read/write operations of the thin-film magnetic head 21 and further controlling the emission operation of a laser diode as a light source for generating laser light for heat-assisted magnetic recording, which will be described later.

The magnetic disk 10, in the present embodiment, is designed for perpendicular magnetic recording, and has a magnetic recording layer (perpendicular magnetization layer) and an optically changeable layer for generating near-field light, which will be described in detail later. The assembly carriage device 12 is a device for positioning the thin-film magnetic head 21 above a track formed on the magnetic disk 10 with recording bits to be aligned thereon. In the apparatus, the drive arms 14 are stacked in a direction along a pivot bearing axis 16 and rotatable around the axis 16 by a voice coil motor (VCM) 15. The structure of the magnetic recording apparatus is not limited to that described above. Each of the magnetic disks 10, the drive arms 14, the HGAs 17 and the sliders 21 may be singular.

Referring also to FIG. 1, a suspension 20 in the HGA 17 has: a load beam 200; a flexure 201 with elasticity fixed to the load beam 200; a base plate 202 provided on the base portion of the load beam 200; and a wiring member 203 that is made up of lead conductors and connection pads electrically connected to both ends of the lead conductors and provided on the flexure 201. The thin-film magnetic head 21 is fixed on the flexure 201, that is, on the top end of the suspension 20 so as to face the surface of each magnetic disk 10 with a predetermined space (flying height) relative to the surface. Moreover, one end of the wiring member 203 is electrically connected to a terminal electrode of the thin-film magnetic head 21. The structure of the suspension 20 is also not limited to that described above. An IC chip for driving the head may be mounted midway in the suspension 20, though not shown.

FIG. 2 shows a perspective view illustrating one embodiment of the thin-film magnetic head 21 according to the present invention.

Referring to FIG. 2, the thin-film magnetic head 21 has a slider 22 and a light source unit 23. The slider 22 is formed of AlTiC ($Al_2O_3$—TiC) or the like, and includes: a slider substrate 220 having an air bearing surface (ABS) 2200 as a opposed-to-medium surface processed so as to obtain an appropriate flying height; and a head part 221 formed on an element-formed surface 2202 perpendicular to the ABS 2200. The light source unit 23 is formed of AlTiC ($Al_2O_3$—TiC) or the like, and includes a unit substrate 230 having a joining surface 2300, and a laser diode 40 as a light source provided on a source-installation surface 2302 perpendicular to the joining surface 2300. Here, the slider 22 and the light source unit 23 are bonded to each other so that a back surface 2201 of the slider substrate 220 is in contact with the joining surface 2300 of the unit substrate 230. Here, the back surface 2201 of the slider substrate 220 is an end surface opposite to the ABS 2200 of the slider substrate 220.

The head part 221, which is formed on the element-formed surface 2202 of the slider substrate 220 of the slider 22, includes: a head element 32 having an MR element 33 for reading data from the magnetic disk and an electromagnetic transducer 34 for writing data onto the magnetic disk; a waveguide 35 for guiding the laser light emitted from the laser diode 40 as a light source provided on the light unit 23; an overcoat layer 38 formed on the element-formed surface 2202 so as to cover the MR element 33, the electromagnetic transducer 34 and the waveguide 35; a pair of terminal electrodes 370 exposed on the upper surface of the overcoat layer 38 and electrically connected to the MR element 33; and a pair of terminal electrodes 371 also exposed on the upper surface of the overcoat layer 38 and electrically connected to the electromagnetic transducer 34. These terminal electrodes 370 and 371 are electrically connected to the connection pads of the wiring member 203 provided on the flexure 202 (FIG. 1).

One ends of the MR element 33, the electromagnetic transducer 34 and the waveguide 35 reach a head end surface 2210 that is a opposed-to-medium surface of the head part 221. Here, the head end surface 2210 and the ABS 2200 constitute a opposed-to-medium surface of the whole thin-film magnetic head 21. During actual write and read operations, the thin-film magnetic head 21 hydrodynamically flies with a predetermined flying height above the surface of a rotating magnetic disk. At this time, one ends of the MR element 33 and the electromagnetic transducer 34 oppose to the surface of a magnetic recording layer of the magnetic disk through an appropriate magnetic spacing. In this state, the MR element 33 performs a read operation by sensing data signal fields from the magnetic recording layer, and the electromagnetic transducer 34 performs a write operation by applying data signal fields to the magnetic recording layer. During the write operation, the laser light, propagated through the waveguide 35 from the laser diode 40 of the light source unit 23, irradiates a part of the optically changeable layer provided in the magnetic disk 10 (FIG. 1), which will be described in detail later. With this irradiation, the near-field light is emitted from the part of the optically changeable layer, to thereby heat a portion of the magnetic recording layer below the part of the optically changeable layer. As a result, the anisotropic magnetic field (coercive force) of the portion of the magnetic recording layer decreases to a writable value. By applying the write field to the portion of the magnetic recording layer where the anisotropic magnetic field has decreased, the heat-assisted magnetic recording is achieved.

Referring also to FIG. 2, the light source unit 23 includes a unit substrate 230, a laser diode 40 mounted on a source-installation surface 2302 of the unit substrate 230, a terminal electrode 410 electrically connected to an electrode that is a lower surface 401 of the laser diode 40, and a terminal electrode 411 electrically connected to an electrode that is an upper surface 403 of the laser diode 40. These terminal electrodes 410 and 411 are electrically connected to the connection pads of the wiring member 203 provided on the flexure 201 (FIG. 1). When a predetermined voltage is applied to the laser diode 40 via both electrodes 410 and 411, laser light is radiated from an emission center locating on an emission surface 400 of the laser diode 40.

By connecting the light source unit 23 with the slider 22, both described above, the thin-film magnetic head 21 is constructed. In this connection, the joining surface 2300 of the unit substrate 230 and the back surface 2201 of the slider substrate 220 are in contact with each other, and the positions of the unit substrate 230 and the slider substrate 220 are determined such that the laser light generated from the laser diode 40 can be incident just on an end surface 352 of the waveguide 35, the surface 352 on the opposite side to the ABS 2200.

The sizes of the slider 22 and the light source unit 23 are arbitrary, but, for example, the slider 22 may have a width in the track width direction (Y-axis direction) of 700 µm, a length (in Z-axis direction) of 850 µm, and a thickness (in X-axis direction) of 230 µm, that is, may be a so-called femto slider. In this case, the light source unit 23 may be one size smaller, having, for example, a width in the track width direction of 425 µm, a length of 300 µm and a thickness of 300 µm.

FIG. 3 shows a cross-sectional view taken by plane A of FIG. 2, schematically illustrating a structure of a major part in the embodiment of the thin-film magnetic head 21 shown in FIG. 2.

Referring to FIG. 3, the MR element 33 includes an MR multilayer 332, and a pair of lower shield layer 330 and upper shield layer 334 between which the MR multilayer 332 and an insulating layer 381 are sandwiched, the element 33 being formed on an insulating layer 380 formed on the element-formed surface 2202. The upper and lower shield layers 334 and 330 prevent the MR multilayer 332 from receiving external magnetic fields that may cause noise. Each of the upper and lower shield layer 334 and 330 is a magnetic layer formed by a frame plating method, sputtering method, or the like, and made of soft magnetic material including, for example, NiFe (permalloy), FeSiAl (Sendust) CoFeNi, CoFe, FeN, FeZrN, CoZrTaCr or the multilayered film of these materials, and has a thickness of, for example, about 0.5-3 µm.

The MR multilayer 332 is a magnetic-field sensing part for sensing signal fields using the MR effect, and may be a CIP-GMR (current-in-plane giant magnetoresistive) multilayer using CIP-GMR effect, a CPP-GMR (current-perpendicular-to-plane giant magnetoresistive) multilayer using CPP-GMR effect, or a TMR (tunnel magnetoresistive) multilayer using TMR effect. The MR multilayer 332 using any one of these MR effects senses signal fields from the magnetic disk with high sensitivity. Incidentally, when the MR multilayer 332 is the CPP-GMR multilayer or the TMR multilayer, the upper and lower shield layers 334 and 330 act also as electrodes. On the other hand, when the MR multilayer 332 is the CIP-GMR multilayer, insulating layers are provided between the MR multilayer 332 and each of the upper and lower shield layers 334 and 330, and further, an MR lead layer, which is electrically connected to the MR multilayer 332, is provided.

When the MR multilayer 332 is, for example, the TMR multilayer, it has a sequentially stacked structure of: an antiferromagnetic layer made of, for example, IrMn, PtMn, NiMn, RuRhMn, with a thickness of about 5-15 nm; a magnetization fixed layer (pinned layer) in which two ferromagnetic layers made of, for example, CoFe, sandwich a nonmagnetic metal layer of Ru or the like between them and the magnetization direction is fixed by the antiferromagnetic layer; a tunnel barrier layer made of an oxidized nonmagnetic dielectric material made by oxidizing a metal film of, for example, Al, AlCu or Mg with a thickness of about 0.5-1 nm with oxygen introduced into a vacuum chamber, or by natural oxidation; and a magnetization free layer (free layer) including two layered films of, for example, CoFe with about 1 nm thick and NiFe with about 3-4 nm thick as ferromagnetic material, and effecting tunnel exchange coupling with the magnetization fixed layer through the tunnel barrier layer.

Referring also to FIG. 3, the electromagnetic transducer 34 is designed for perpendicular magnetic recording, and includes a main magnetic pole layer 340, a gap layer 341, a write coil layer 343, a coil insulating layer 344 and a write shield layer 345.

The main magnetic pole layer 340 is formed on an insulating layer 384 made of insulating material such as $Al_2O_3$ (alumina), and acts as a magnetic path for converging and guiding the magnetic flux, generated by applying write current to the write coil layer 343, to the magnetic recording layer (perpendicular magnetization layer) of the magnetic disk 10 (FIG. 1) to be recorded. The main magnetic pole layer 340 has a two-layered structure in which a main magnetic pole 3400 and a main pole body 3401 are sequentially stacked to magnetically connect to each other. The main magnetic pole 3400 is insulated at the surrounding by the insulating layer 384 made of insulating material such as $Al_2O_3$ (alumina). This main magnetic pole 3400 reaches the head end surface 2210, and has a main pole front end 3400a having a small width $W_p$ (FIG. 5b) in the track width direction, and a main pole rear end 3400b locating at the rear side of the main pole front end 3400a and having a larger width in the track width direction than that of the main pole front end 3400a. Thus, the main pole front end 3400a, having a small width $W_p$, can generate a fine write field, and can set the track width to a minute value corresponding to higher recording density.

The main magnetic pole 3400 is formed of soft magnetic material with higher saturation magnetic flux density than that of the main pole body 3401, and formed of soft magnetic material, for example, ferrous alloy with Fe as its main constituent, such as FeNi, FeCo, FeCoNi, FeN, or FeZrN. The thickness of the main magnetic pole 3400 is, for example, 0.1-0.8 µm. The gap layer 341 forms a gap for magnetically separating the main magnetic pole layer 340 from the write shield layer 345 at the vicinity of the head end surface 2210. The gap layer 341 is formed of nonmagnetic insulating material, such as $Al_2O_3$ (alumina), SiO2 (silicon dioxide), AlN (aluminum nitride) or DLC (diamond-like carbon), or nonmagnetic conductive material such as Ru (ruthenium). The thickness of the gap layer 341 regulates a gap between the main magnetic pole layer 340 and the write shield layer 345, and is, for example, about 0.01-0.5 μm.

The write coil layer 343 is formed on an insulating layer 3421 made of insulating material, such as $Al_2O_3$ (alumina), so as to pass through at least between the main magnetic pole layer 340 and the write shield layer 345 during one turn, and has a spiral structure wound around a back contact portion 3402 as the center. The write coil layer 343 is formed of, for example, conductive material such as Cu (copper). Here, the write coil insulating layer 344, formed of insulating material such as heat-cured photoresist, covers the write coil layer 343, and electrically insulates the write coil layer from the main magnetic pole layer 340 and the write shield layer 345. The write coil layer 343 is a monolayer in the present embodiment, however may also have a two or more layered structure or a helical coil shape. The number of turns is not limited to that shown in FIG. 3, and may be set to, for example, 2-7 turns.

The write shield layer 345 reaches the head end surface 2210, and acts as a magnetic path for the magnetic flux returned from an under layer provided under the perpendicular magnetization layer of the magnetic disk. The thickness of the write shield layer 345 is, for example, about 0.5-5 μm. In the write shield layer 345, a portion opposing to the main magnetic pole layer 340 also reaches the head end surface 2210, and serves as a trailing shield 3450 for catching the magnetic flux generated and spread from the main magnetic pole layer 340. The trailing shield 3450 in the present embodiment is flattened together with an insulating layer 3420 and the main pole body 3401, and has a larger width in the track width direction than that of the main pole rear end 3400b and the main pole body 3401 as well as the main pole front end 3400a. By providing the trailing shield 3450, a magnetic field gradient between the end portion of the trailing shield 3450 and the main pole front end 3400a becomes steeper. As a result, a jitter of signal outputs becomes smaller, and therefore, an error rate during reading can be decreased. The write shield layer 345 is formed of soft magnetic material, and particularly, the trailing shield 3450 is formed of NiFe (permalloy) or ferrous alloy material as used in the main magnetic pole 3400 having high saturation magnetic flux density.

In the present embodiment, an inter-element shield layer 39 is provided between the MR element 33 and the electromagnetic transducer 34, and sandwiched between insulating layers 382 and 383. The inter-element shield layer 39 acts for shielding the MR element 33 from the magnetic field generated from the electromagnetic transducer 34, and may be formed of soft magnetic material similar to that used in the upper and lower shield layers 334 and 330. Meanwhile, the inter-element shield layer 39 is not necessarily provided, and an embodiment that does not have the inter-element shield layer 39 is also within the scope of the present invention. Moreover, a backing coil layer may be formed between the inter-element shield layer 39 and the waveguide 35. The backing coil layer generates a magnetic flux for negating the magnetic loop that arises from the electromagnetic transducer 34 through the upper and lower shield layers 334 and 330 of the MR effect element 33, and suppresses a wide adjacent track erasure (WATE) phenomenon which is an unwanted write or erase operation to the magnetic disk.

The waveguide 35 in the present embodiment is provided between the MR element 33 and the electromagnetic transducer 34, that is, provided at the leading side (−Z direction) of the electromagnetic transducer 34. However, the waveguide 35 is not always limited to this position, and it is also possible to be provided at the trailing side (+Z direction) of the electromagnetic transducer 34. As described in detail later, by properly setting a positional relationship between an end surface of the waveguide 35 on the head end surface 2210 side and an end surface of the magnetic pole of the electromagnetic transducer 34 on the head end surface 2210 side, the distance between both end surfaces, and the shape and size of the end surface of the waveguide 35 on the head end surface 2210 side, either optical dominant recording or magnetic dominant recording is selectable. Further, for example, it is also possible to perform the optical dominant recording in the direction along track and the magnetic dominant recording in the track width direction. Alternatively, in the thin-film magnetic head 21, the laser diode 40 may be directly mounted on the slider 22 without using the light source unit 23. The structure of the waveguide 35 will be explained in detail later referring to FIGS. 5a and 5b. In FIG. 3, the insulating layers 380, 381, 382, 383, 384 and 385 constitute the overcoat layer 38 (FIG. 2) as a whole. It is preferable that the waveguide 35 is surrounded by such an overcoat layer 38.

Referring also to FIG. 3, the laser diode 40, for example, may have a sequentially stacked structure of an n-electrode 40a, an n-GaAs substrate 40b, an n-InGaAlP clad layer 40c, a first InGaAlP guide layer 40d, an active layer 40e consisting of multiple-quantum wells (InGaP/InGaAlP) or the like, a second InGaAlP guide layer 40f, a p-InGaAlP clad layer 40g, a p-electrode base layer 40h, and a p-electrode 40i. Reflection layers, which are made of $SiO_2$, $Al_2O_3$ or the like for exciting oscillation by total reflection, are formed at the front and the rear of cleavage faces of the multilayer structure, and the reflection layer 42 has an opening provided at the position of the active layer 40e including an emission center 4000. The wavelength $\lambda_L$ of the emitted laser light is, for example, about 400-800 nm. The wavelength is selected, as will be described in detail later, such that the laser light can make transparent the optically changeable layer provided in the magnetic disk 10 (FIG. 1), or can change the refraction index of the optically changeable layer. The laser light emitted from the laser diode 40 is not always parallel rays but may have a divergent angle. Moreover, an optical system for collimating the laser light may not be provided in the optical path up to the waveguide 35. The thickness $T_{LA}$ of the laser diode 40 is, for example, about 60-200 μm.

For driving the laser diode 40, a power source in the magnetic disk apparatus is usable. Actually, the magnetic disk apparatus usually has a power source with, for example, about 2 V, which is enough voltage for laser exciting operation. Moreover, the power consumption of the laser diode 40 is, for example, about several ten mW, which the power source in the magnetic disk apparatus can afford sufficiently. Actually, by applying a predetermined voltage between a terminal electrode 410, which is electrically connected to the p-electrode 40i, and a terminal electrode 411, which is electrically connected to the n-electrode 40a, to excite the laser diode 40, the laser light can be radiated from the opening including the emission center 4000 of the reflection layer 42.

The configuration of the laser diode 40, and the driving terminal electrodes 410 and 411 are not limited to the embodiment described above. For example, the electrodes of the laser diode 40 may be set upside down for the n-electrode 40a to be bonded to the source-installation surface 2302 of the unit substrate 230. The laser diode 40 may have another configuration using other semiconductor material, for example, of GaAlAs type. Moreover, as the laser diode 40, a laser diode having the same structure as usually used in an optical disk storage device can be used. Furthermore, the thin-film magnetic head 21 may not have the laser diode 40, and the emission center of the laser diode provided in the magnetic disk apparatus may be connected to the end surface 352 of the wave guide 35, for example, by using an optic fiber.

Figure 4A:
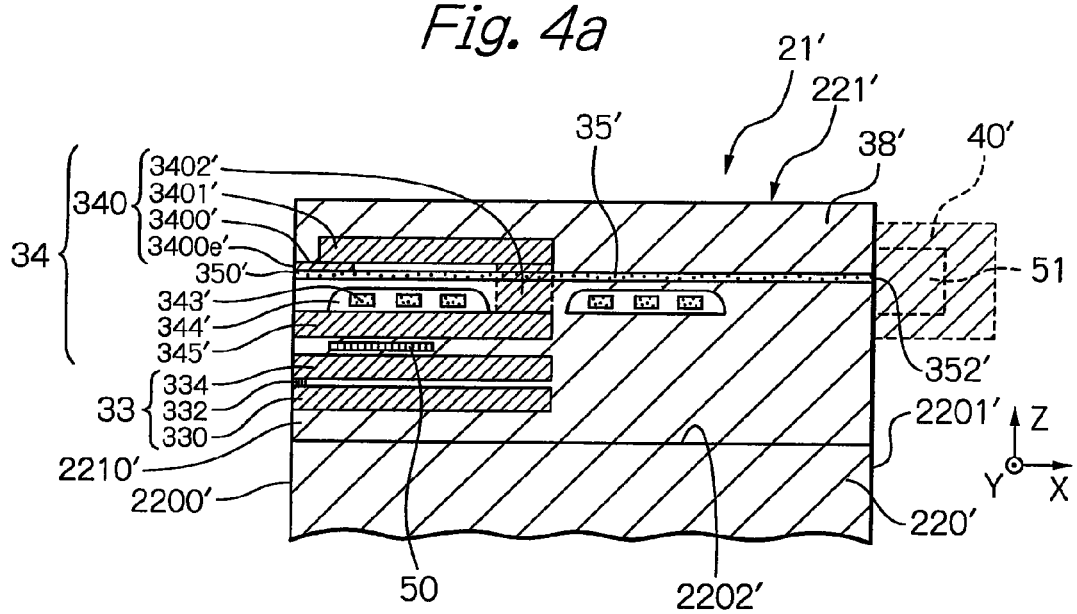
FIGS. 4a and 4b show cross-sectional views schematically illustrating a structure of a major part in another embodiment of the thin-film magnetic head according to the present invention.
Figure 4B:
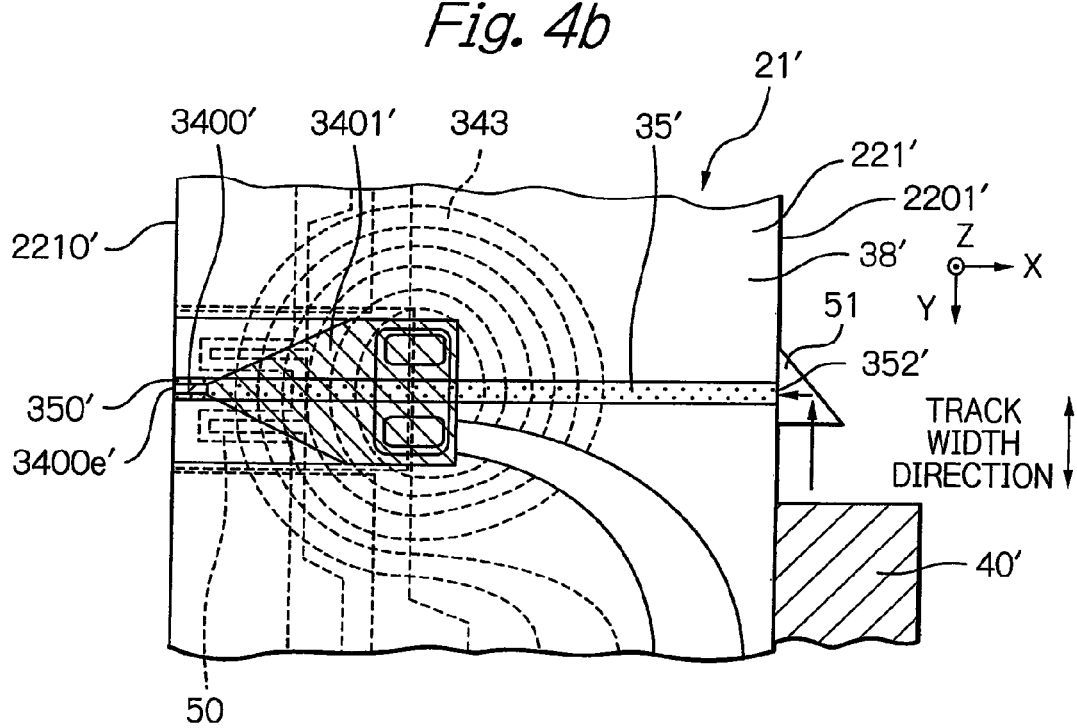

FIGS. 4a and 4b show cross-sectional views schematically illustrating a structure of a major part in another embodiment of the thin-film magnetic head according to the present invention. FIG. 4a is a cross-sectional view taken by a plane in parallel with ZX plane, and FIG. 4b is a cross-sectional view taken by a plane in parallel with XY plane.

Referring to FIGS. 4a and 4b, a thin-film magnetic head 21' of the present embodiment includes a slider substrate 220' having an ABS 2200', and a head part 221' formed on an element-formed surface 2202' perpendicular to the ABS 2200'. On a back surface 2201' of the slider substrate 220', there are provided with a laser diode 40', and a prism 51 for directing the laser light radiated from the laser diode 40' toward a waveguide 35' to be described later.

The head part 221' of the thin-film magnetic head 21' includes, similar to the embodiment shown in FIG. 3, an MR element 33', an electromagnetic transducer 34', and a waveguide 35' for guiding the laser light from the laser diode 40' to the opposed-to-medium surface side. One ends of these MR element 33', the electromagnetic transducer 34' and the waveguide 35', similar to the embodiment shown in FIG. 3, reach a head end surface 2210'.

However, the electromagnetic transducer 34' in the embodiment has a sequentially stacked structure of, from the slider substrate 220' side, an auxiliary magnetic pole layer 345', a write coil layer 343', a coil insulating layer 344' surrounding the layer 343', and a main magnetic pole layer 340'. Here, the main magnetic pole layer 340' includes a main magnetic pole 3400' one end of which reaches the head end surface 2210', a yoke magnetic pole 3401' provided in contact with the upper surface of the main magnetic pole 3400', and a back contact magnetic pole 3402' connecting the yoke magnetic pole 3401' to the auxiliary magnetic pole layer 345'. The waveguide 35' is extended from an end surface 352' on the back surface 2201' side to an end surface 350' on the head end surface 2210' passing through between the write coil layer 343' and the main magnetic pole layer 340'. As a result, the end surface 350' of the waveguide 35' is positioned at the leading side (−Z direction side) of an end surface 3400e' of the main magnetic pole 3400' on the head end surface 2210'.

Also in the head of the above-described embodiment, during the write operation by the electromagnetic transducer 34', the laser light, transmitted through the prism 51 and the waveguide 35' from the laser diode 40', can irradiate a part of the optically changeable layer provided on the magnetic disk 10 (FIG. 1), which will be described in detail later. With this irradiation, the near-field light is emitted from the part of the optically changeable layer, to thereby heat a portion of the magnetic recording layer below the part of the optically changeable layer. As a result, the anisotropic magnetic field (coercive force) of the part of the magnetic recording layer decreases to a writable value. By applying the write field to the part of the magnetic recording layer where the anisotropic magnetic field has decreased, the heat-assisted magnetic recording can be performed.

Furthermore, in the embodiment of FIGS. 4a and 4b, a heating element 50 is provided between the MR element 33' and the electromagnetic transducer 34'. The heating element 50 generates heat with application of electric power, and this heat causes thermal expansion of the MR element 33', the electromagnetic transducer 34', the waveguide 35' and further an overcoat layer 38', which are disposed around the element 50. With this heating, the ends of the MR element 33' and the electromagnetic transducer 34' on the head end surface 2210' side protrude toward the magnetic disk to reduce the flying height, which controls the magnetic spacing to a smaller value, the spacing being a distance between these element ends and the surface of magnetic recording layer in the magnetic disk. The end surface 350' of the waveguide 35' also protrudes toward the magnetic disk, and therefore the laser light emitted from the end surface 350' can more reliably reach the optically changeable layer of the magnetic disk, which will be described later. From the reason described above, by providing the heating element 50, it becomes possible to improve write efficiency and read efficiency.

The heating element 50 may be a line pattern having a line width of, for example, about 1-100 μm, and can be formed of, for example, NiCu, NiCr, Ta, W, Ti, Cu, Au, Al or NiFe, or alloy material having any one of these components as its main constituent. Incidentally, the thin-film magnetic head 21' may not always have the heating element 50. Moreover, the thin-film magnetic head 21' may not have the laser diode 40', and the emission center of the laser diode provided in the magnetic disk apparatus may be connected to the end surface 352' of the wave guide 35', for example, by using an optic fiber.

FIGS. 5a1 and 5a2 show perspective views illustrating two embodiments of the waveguide 35. Further, FIGS. 5b to 5c3 show plain views illustrating the shapes of the ends of the electromagnetic transducer 34 and the waveguide 35 on the head end surface 2210.

The waveguide 35 may be, as shown in FIG. 5a1, a rectangular parallelepiped extending in X-axis direction from the end surface 352 on the back surface 2201 (FIG. 3) to the end surface 350 on the head end surface 2210, however can be any shape, as long as the light is guided from the end surface 352 on which the light is incident, to the end surface 350 from which the light exits, and the light radiates from the end surface 350. Particularly, as shown in FIG. 5a2, the portion of the waveguide 35 on the head end surface 2210 side may be tapered toward the head end surface 2210 in the track width direction (Y-axis direction). Further, the waveguide 35 may be tapered toward the end surface in the thickness direction (Z-axis direction). By providing such a tapered portion, the area of the end surface 350, from which the laser light radiates toward the magnetic disk, can be smaller, and therefore, the irradiated region of the laser light on the magnetic disk can be made narrower. In FIG. 5a2, the width $W_{WG0}$ in the track width direction (Y-axis direction) of the waveguide 35 at the end surface 352 may be, for example, about 1-200 μm, the width $W_{WG1}$ in the track width direction (Y-axis direction) at the end surface 350 may be, for example, about 0.05-10 μm, and further the thickness $T_{WG0}$ (in Z-axis direction) at the end surface 352 may be, for example, about 0.1-4 μm, the thickness $T_{WG1}$ (in Z-axis direction) at the end surface 350 may be, for example, about 0.005-1 μm, and the length (height) $L_{WG}$ (in X-axis direction) may be, for example, about 10-300 μm.

Moreover, in both of the embodiments of FIGS. 5a1 and 5a2, the surface of the waveguide 35 except the end surfaces 350 and 352 may preferably have a surface contact with the overcoat layer 38 (FIG. 2). Here, the material of waveguide 35 has a higher refractive index n than that of the overcoat layer 38, and made of, for example, dielectric material and formed by using a sputtering method. For instance, when the overcoat layer 38 is formed of $SiO_2$ (n=1.5), the waveguide 35 may be formed of $Al_2O_3$ (n=1.63). Further, when the overcoat layer 38 is formed of $Al_2O_3$ (n=1.63), the waveguide 35 may be formed of $SiO_xN_y$ (n=1.7 to 1.85), $Ta_2O_5$ (n=2.16), $Nb_2O_5$ (n=2.33), TiO (n=2.3 to 2.55) or $TiO_2$ (n=2.3 to 2.55). Formation of the waveguide 35 using any of these materials allows the propagation loss of the laser light to be smaller due to excellent optical properties the material itself has. Furthermore, the waveguide 35 acts as a core and the overcoat layer 38 functions as a clad, which meets a total reflection condition at their border. This allows the laser light 48 to reach the end surface 350 with more quantity, and improves the propagation efficiency of the waveguide 35.

Moreover, as shown in FIG. 5b, on the head end surface 2210, the end surface 350 of the waveguide 35 is positioned at the leading side (−Z direction side) when viewed from the end surface 3400e of the main magnetic pole 3400 of the electromagnetic transducer 34. Here, the end surface 3400e may have a shape of rectangle (square) or trapezoid. In any case, a width $W_p$ in the track width direction of the main magnetic pole 3400 is a length of an edge on the leading side (−Z direction side) of the end surface 3400e. The width $W_p$ may be, for example, about 0.05-0.5 μm. On the other hand, the end surface 350 of the waveguide 35 may have a shape of ellipsoid with a longer axis in the track width direction (Y-axis direction) as shown in FIG. 5b, or may have any one of shapes of rectangle (square), trapezoid and circle as shown in FIGS. 5c1 to 5c3, respectively.

Here, a distance in Z-axis direction between a spot center 3500 on the end surface 350 of the laser light radiated from the end surface 350 and the edge 3400f on the leading side (−Z direction side) of the main magnetic pole 3400 is indicated by $D_{MW}$. In the heat-assisted magnetic recording according to the present invention, by properly setting the distance $D_{MW}$ and the shape and the size (the width $W_{WG1}$ and the thickness $T_{WG1}$) of the end surface 350, it is possible to select the optical dominant recording or the magnetic dominant recording, in each of the direction along track and the track width direction. In the present invention, since the near-field light for the heat assistance is generated in the magnetic recording medium, the smallest diameter and width (the width $W_{WG1}$ and the thickness $T_{WG1}$) on the end surface 350 of the waveguide 35 can be set to be larger than the wavelength of the laser light propagated through the waveguide 35. That is, when forming the waveguide 35, it is possible to avoid difficult fine processes on the order of less than the wavelength of the laser light. This can contribute to improvement of the yield for manufacturing heads.

Here, the waveguide 35 may have a multilayered structure formed of dielectric material with higher refractive index n toward upper layers. For instance, by sequentially stacking dielectric materials $SiO_XN_Y$ with the constituent ratios X and Y properly changed, such a multilayered structure can be implemented. The number of layers may be, for example, 8-12 layers. As a result, when the laser light 48 is linearly polarized light in Z-axis direction, the spot center 3500 of the laser light 48 on the end surface 350 can be positioned closer to the electromagnetic transducer 34 in Z-axis direction. In this case, by selecting the composition and layer thickness of each layer and the number of layers in the multilayered structure, the desired value of the width $D_{MW}$ can be attained.

Figure 6A:
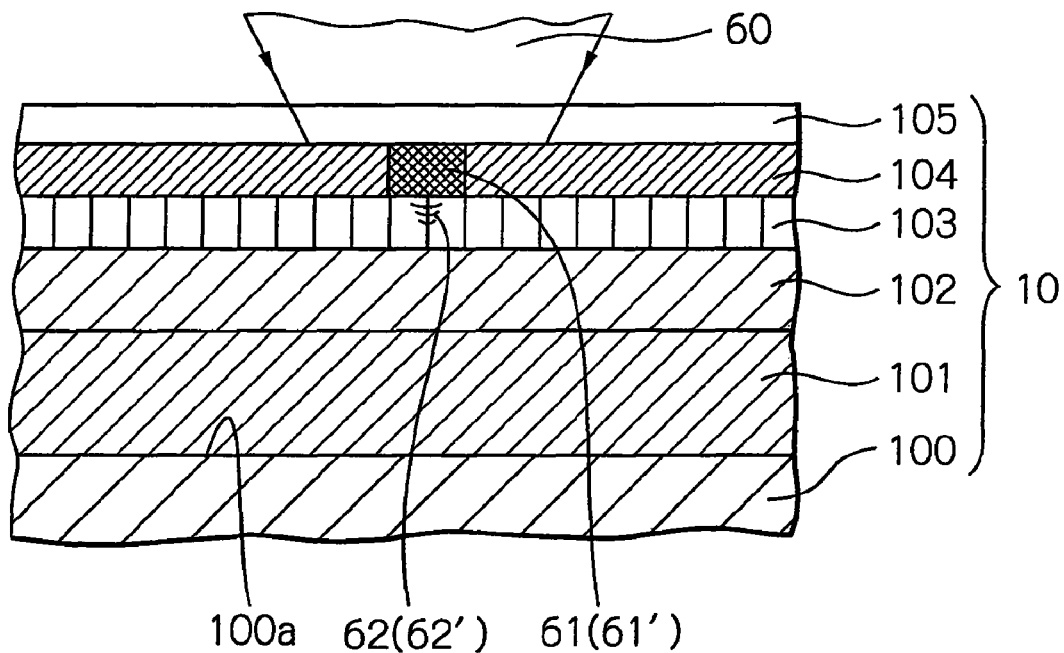
FIGS. 6a and 6b show cross-sectional views taken by a surface perpendicular to a medium surface, illustrating two embodiments of the magnetic recording medium according to the present invention.
Figure 6B:
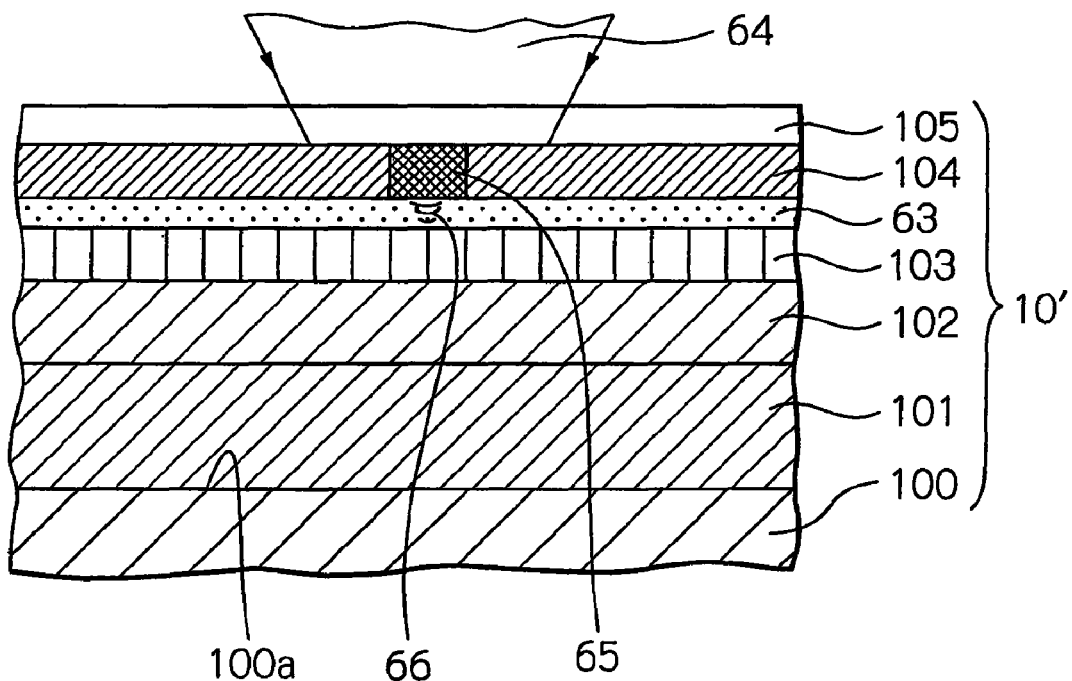

FIGS. 6a and 6b show cross-sectional views taken by a surface perpendicular to a medium surface, illustrating two embodiments of the magnetic recording medium according to the present invention.

Referring to FIG. 6a, the magnetic disk 10 is a medium designed for perpendicular magnetic recording, the medium having a multilayered structure in which sequentially stacked on a disk substrate 100 is: an under layer 101 acting as a part of the magnetic path for the write magnetic flux from the main magnetic pole; an intermediate layer 102; a magnetic recording layer 103 as a perpendicular magnetization layer; an optically changeable layer 104 positioned on the magnetic recording layer 103 and on the side opposite to the disk substrate 100 relative to the magnetic recording layer 103, the optically changeable layer 104 being made transparent or its refractive index being changed when irradiated by the light with an intensity not less than a predetermined one; and an protecting layer (lubricant layer) 105. Here, the intermediate layer 102 serves as an undercoat layer to control the particle size and orientation of crystals of the magnetic recording layer 103, however the magnetic disk 10 may have a structure excluding the intermediate layer 102. The medium may have a magnetic-domain control layer as an undercoat of the under layer 101, the control layer being for imparting the anisotropic magnetic field in the track width direction to the under layer 101 and controlling the magnetic domains of the under layer 101, formed of anti-ferromagnetic material such as an alloy with MnIr as its main constituent, with a thickness of, for example, about 1-30 nm.

The disk substrate 100 is formed of glass, Al or Al alloy, and has a layer-stacked surface 100a on which a multilayered structure is formed. The under layer 101 is formed of soft magnetic material such as an alloy including, for example, FeSi, NiFe, FeAlSi, FeTaC, FeTaN, FeNbC, FeTiC, CoTaZr, CoNbZr or FeCoB, with a thickness of, for example, about 30-50 nm. The intermediate layer 102 is formed of nonmagnetic material such as, for example, Ru, Ti, Ta, Ge, Au, Al, Pt, Cu, CoCr or TiCr, or an alloy mainly including one of these materials, or MgO, C, Si or a material mainly including one of these materials, with a thickness of, for example, about 1-5 nm. The magnetic recording layer 103 is formed of, for example, CoCr, CoPt, FePt, or an alloy mainly including one of these materials, or granular medium material mainly including $CoPtCr—SiO_2$ or $CoPt—TiO_2$, with a thickness of, for example, about 1-30 nm. Here, under the layer made of the granular medium material, an undercoat film of Ru, etc. may be formed. Further, the magnetic recording layer 103 may have a double-layered structure consisting of a continuous layer and a granular layer (CGC medium structure). Here, the continuous layer may be formed of a multilayered film mainly including a Co/Pt multilayered structure, a multilayered film mainly including a Co/Pd multilayered structure, or an alloy mainly including CoPtCr. The granular layer may be formed of granular medium material mainly including $CoPtCr—SiO_2$ or $CoPt—TiO_2$.

The optically changeable layer 104 is positioned on the magnetic recording layer 103 and on the side opposite to the disk substrate 100 relative to the magnetic recording layer 103. The optically changeable layer 104 may be formed of, for example, Sb (antimony), alloy including Sb, $LiNbO_3$ (lithium niobate),or methyl-2-nitroaniline so that, when the layer 104 is irradiated by the light with an intensity not less than a predetermined intensity, the temperature of the irradiated portion rises to or more than a transparency-making temperature and the portion becomes transparent. Or the optically changeable layer 104 may be formed of, for example, antimony oxide, silver oxide, or terbium oxide so that, when the layer 104 is irradiated by the light with an intensity not less than a predetermined intensity, the temperature of the irradiated portion rises to or more than a threshold for changing the refractive index and the refractive index changes. Here, as the alloy including Sb, there may be employed, for example, SbGeTe alloy, SbAgTnTe alloy, and SbInTeV alloy. The thickness of optically changeable layer 104 is, for example, about 1-30 nm, and the layer 104 with the thickness in this range can generate the near-field light as will be described later. The protecting layer 105 may be formed of nonmagnetic material such as, for example, C (carbon), DLC (diamond-like carbon), with a thickness of, for example, about 1-5 nm. Each layer described above may have a two or more layered structure instead of monolayer, and further the multilayered structure may have a nonmagnetic layer interposed between the layers. Moreover, it is also possible to add a separation layer, orientation layer, etc. between respective layers described above. Moreover, a part of layers out of these layers may not be formed. The thickness of each of the optically changeable layer 104 and the protecting layer 105 is set to a value such that the magnetic spacing, which is the distance between the head-element end and the surface of the magnetic recording layer, can be small enough.

A description will be given of the principle that the irradiation of laser light 60 enables the heat-assisted magnetic recording, with reference to FIG. 6a. Initially, the laser light 60, which radiates from the light-exit end surface of the waveguide, irradiates the optically changeable layer 104 of the magnetic disk 10. The intensity of the laser light 60 is generally represented, on the surface of the irradiated optically changeable layer 104, by a Gaussian distribution or other distributions with the spot center set as a median, and becomes higher toward the spot center. Here, when the optically changeable layer 104 is formed of the material described above that becomes transparent due to the irradiation of the light with an intensity not less than a predetermined one, the temperature of the confined portion including the spot center irradiated by the predetermined intensity rises to or more than the transparency-making temperature, and the confined portion only becomes transparent. As a result, an optically minute opening 61 is formed on the optically changeable layer 104, the opening 61 having a diameter smaller than the spot diameter of the laser light 60 on the surface of the optically changeable layer 104, further the diameter being shorter than the wavelength of the laser light 60. The irradiation of the laser light 60 on the minute opening 61 enables near-field light 62 to be generated from the magnetic recording layer 103 side of the opening 61. The irradiation of the near-field light 62 on the magnetic recording layer 103 heats the irradiated portion of the magnetic recording layer 103, which lowers the anisotropic magnetic field (coercive force) of the portion. The portion, in which the anisotropic magnetic field has been lowered, has a sufficiently small diameter compared to the wavelength of the laser light 60. By applying write field to the portion of the magnetic recording layer 103, the heat-assisted magnetic recording can be achieved with higher recording density.

On the other hand, when the optically changeable layer 104 is formed of the material described above in which the refractive index changes due to the irradiation of the light with an intensity not less than a predetermined one, the temperature of the confined portion irradiated with the predetermined intensity including the spot center of the laser light 60 rises to or more than a threshold for changing the refractive index, and the refractive index of the confined portion only changes. Here, the refractive-index-changed area 61' has a diameter smaller than the spot diameter of the laser light 60 on the surface of the optically changeable layer 104, further the diameter being shorter than the wavelength of the laser light 60. As a result, the irradiation of the laser light 60 on the area 61' enables near-field light 62' to be generated at the border between the area 61' and its surrounding. The irradiation of the near-field light 62' on the magnetic recording layer 103 heats the irradiated portion of the magnetic recording layer 103, which lowers the anisotropic magnetic field (coercive force) of the portion. The portion, in which the anisotropic magnetic field has been lowered, has a sufficiently small diameter compared to the wavelength of the laser light 60. By applying write field to the portion of the magnetic recording layer 103, the heat-assisted magnetic recording can be achieved with higher recording density.

Alternatively, it is also possible to form a minute opening or a refractive-index-changed area on the optically changeable layer 104 of the magnetic disk 10 according to the present invention, by irradiating the near-field light on the optically changeable layer 104 with use of a head having an element for generating the near-field light. In this case, if the configuration is established so as to form the minute opening or the refractive index-changed area more finely, that can contribute to the improvement of recording density.

Referring to FIG. 6b that shows another embodiment of the magnetic disk according to the invention, the magnetic disk 10' has a spacer layer 63 sandwiched between the magnetic recording layer 103 and the optically changeable layer 104. The spacer layer 63 can be formed of dielectric material, for example, $SiO_2$, $Al_2O_3$, SiN, $TiO_2$, etc. with a thickness of, for example, about 0.1-30 nm. When the spacer layer 63 is provided, near-field light 66, which is generated from the minute opening or the refractive index-changed area 65 due to the irradiation of laser light 64, irradiates the magnetic recording layer 103 after propagating through the spacer layer 63. Accordingly, it is possible to control the near-field light for irradiating the magnetic recording layer 103 by adjusting the material and layer thickness of the spacer layer 63.

Figure 7A:
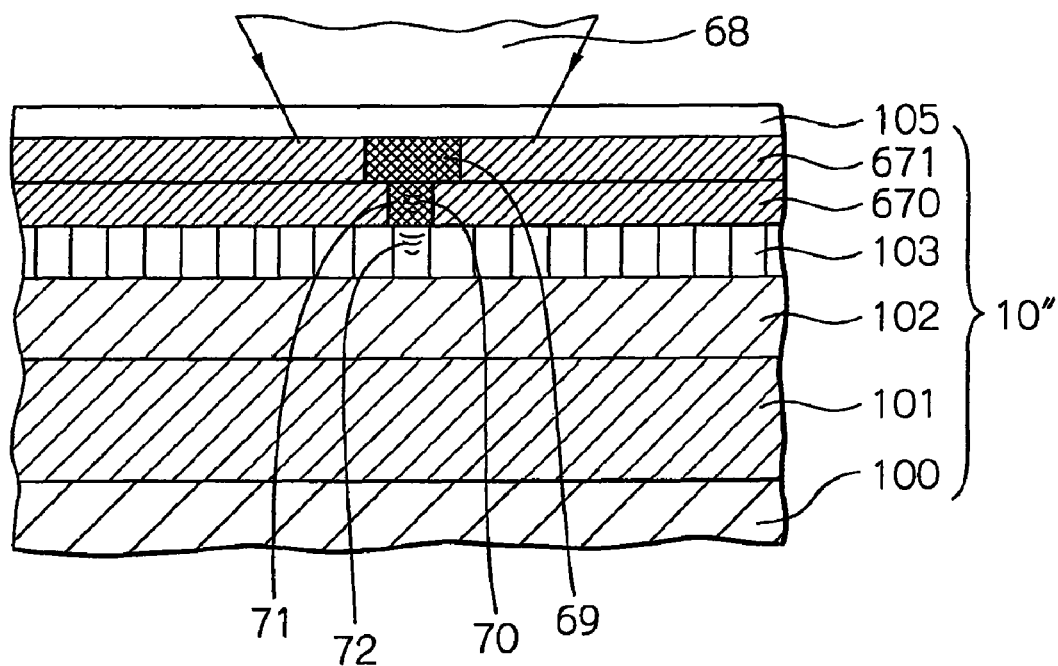
FIGS. 7a and 7b show cross-sectional views taken by a surface perpendicular to a medium surface, illustrating other embodiments of the magnetic recording medium according to the present invention.
Figure 7B:
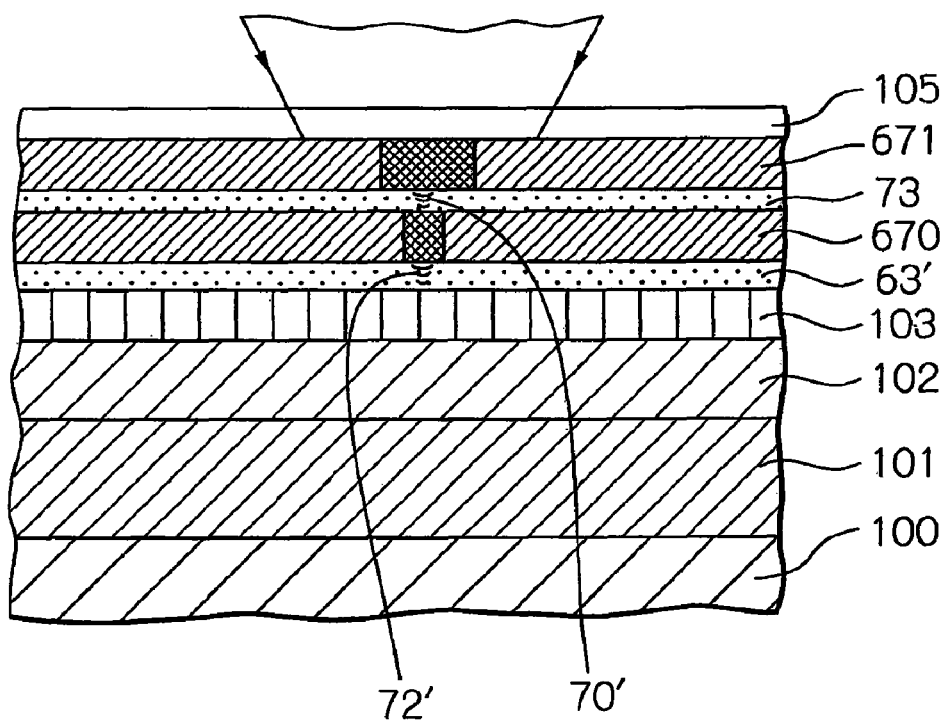

FIGS. 7a and 7b show cross-sectional views taken by a surface perpendicular to a medium surface, illustrating other embodiments of the magnetic recording medium according to the present invention.

Referring to FIG. 7a, the magnetic disk 10" has a multi-layered structure in which sequentially stacked on a disk substrate 100 is the under layer 101, the intermediate layer 102, the magnetic recording layer 103, a first optically changeable layer 670, a second optically changeable layer 671, and the protecting layer (lubricant layer) 105. Here, the first optically changeable layer 670 and the second optically changeable layer 671 are formed of optical materials, which are made transparent or whose refractive index is changed when irradiated by the light with an intensity not less than a predetermined one, these materials being different from each other. For instance, the first and second optically changeable layers 670 and 671 may be formed of materials, both of which are made transparent or refractive indexes of both of which are changed when irradiated by the light with an intensity not less than a predetermined one, and these materials being different from each other. Alternatively, the first optically changeable layer 670 may be formed of the material that is made transparent when irradiated by the light with an intensity not less than a predetermined one, and the second optically changeable layer 671 formed of the materials whose refractive index is changed when irradiated by the light with an intensity not less than a predetermined one. When a spacer layer is provided between the first optically changeable layer 670 and the second optically changeable layer 671, both layers may be formed of the same material.

When the second optically changeable layer 671 receives laser light 68, a minute opening or a refractive index-changed area 69 is formed. The diameter of the opening or the area 69 is smaller than the spot diameter of the laser light 68, and further shorter than the wavelength of the laser light 68. Subsequently, when the laser light 68 irradiates the opening or the area 69, near-field light 70 is generated from the opening or the area 69. When the near-field light 70 further irradiates the first optically changeable layer 670, the temperature of the portion 71 of the first optically changeable layer 670 that has received the near-field light 70 rises to or exceeds the transparency-making temperature or the threshold of changing the refractive index. As a result, the portion 71 is made transparent or the refractive index of the portion changes. The diameter of the portion 71 becomes much smaller than that of the opening or the area 69. Accordingly, near-field light 72 generated from the portion 71 propagates within a more confined range. When the near-field light 72 irradiates the magnetic recording layer 103, the anisotropic magnetic field at the finer portion only on the magnetic recording layer 103 is lowered. As a result, the heat-assisted magnetic recording can be achieved with much higher recording density.

Alternatively, as shown in FIG. 7b, in a magnetic disk 10", a spacer layer 73 may be provided between the first optically changeable layer 670 and the second optically changeable layer 671 for near-field light 70' to propagate through it. Further, a spacer layer 63' may be provided between the magnetic recording layer 103 and the first optically changeable layer 670 for near-field light 72' to propagate through it.

Figure 7C:
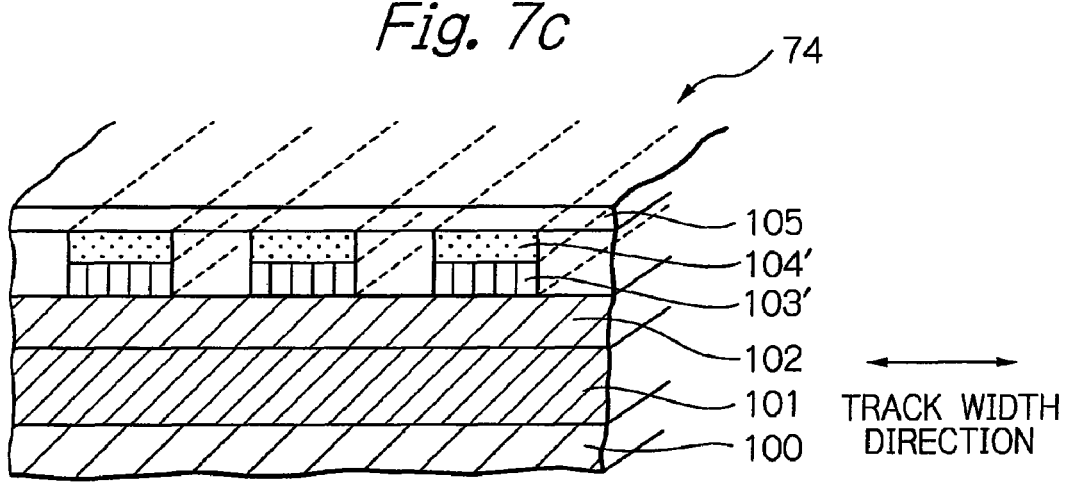
FIGS. 7c to 7e show cross-sectional views illustrating further embodiments of the magnetic recording medium according to the present invention, each view taken by a surface perpendicular to a medium surface and in parallel with the track width direction.
Figure 7D:
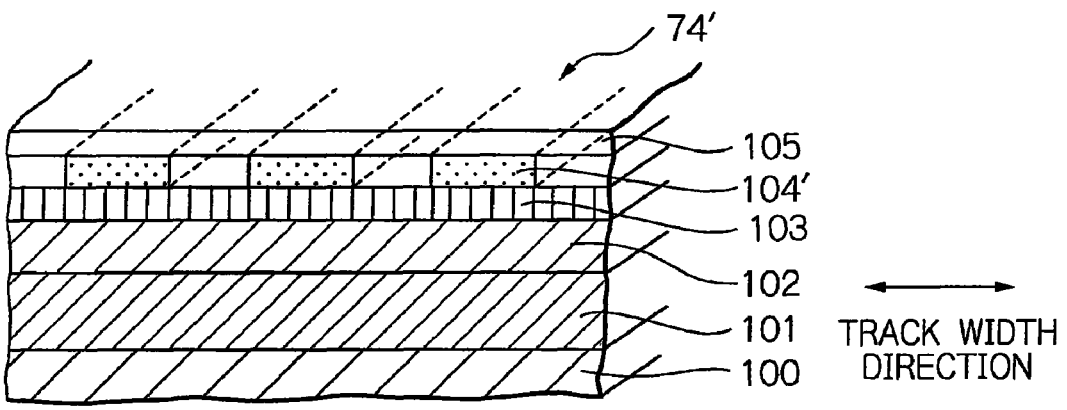
Figure 7E:
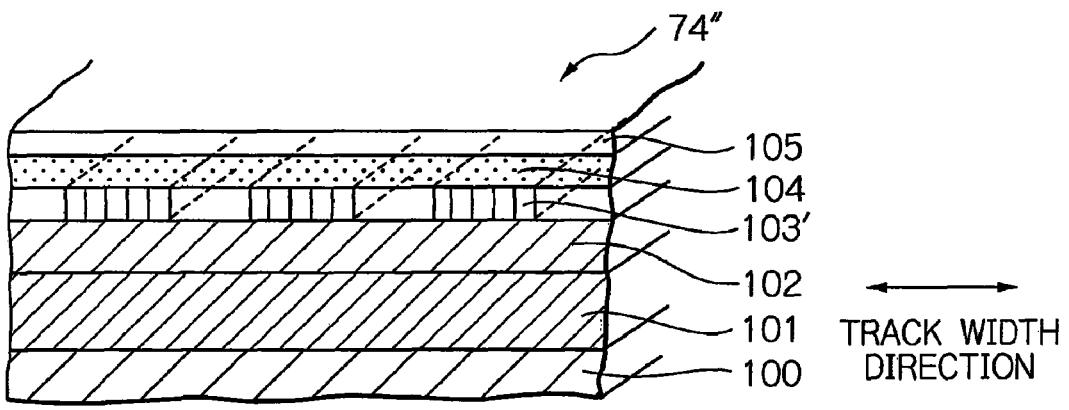

FIGS. 7c to 7e show cross-sectional views illustrating further embodiments of the magnetic recording medium according to the present invention, each view taken by a surface perpendicular to a medium surface and in parallel with the track width direction.

Referring to FIG. 7c, in a discrete track medium 74 as a magnetic recording medium according to the present invention, on the disk substrate 100, there are formed of the under layer 101 and the intermediate layer 102. And on the intermediate layer 102, there are formed of a magnetic recording layer 103' and an optically changeable layer 104', both having the form of ridge-shaped discrete tracks. That is, the magnetic recording layer 103' and the optically changeable layer 104' are patterned so as to have a track pattern in which the tracks are separated apart from each other in the track width direction. Thus, the discrete track medium 74 has a structure in which the layers that are made of respective materials for the perpendicular magnetization layer and the optically changeable layer have fine grooves extending along the track direction. By employing such a structure, adjacent tracks are physically separated from each other to thereby reduce magnetic interference between tracks. As a result, the surface recording density can be dramatically improved. Actually, the discrete tracks can be formed by using an ultra-fine process technology, such as electron beam lithography and a fine dry etching process, to achieve a track pitch of, for example, 90 nm or less.

In the discrete track medium 74, for example, a recording-bit width in the track width direction can be regulated by the discrete-track width, and a recording-bit length along the track direction can be regulated by the propagation range of near-field light generated from an opening or a refraction index-changed area formed on the optically changeable layer 104'.

Referring to FIG. 7d, in a medium 74', the under layer 101, the intermediate layer 102 and the magnetic recording layer 103 are sequentially stacked on the disk substrate 100. And on the magnetic recording layer 103, there are formed of the ridge-shaped optically changeable layer 104' extending along the track direction. According to this structure, even if the magnetic recording layer 103 does not have the form of physically separated tracks, by the irradiation of the near-field light generated from the optically changeable layer 104' having the form of physically separated tracks in the track width direction, it is possible to securely form recording bits aligning in the track width direction with high density on the magnetic recording layer 103. In this case, the recording-bit length along the track direction can be also regulated by the propagation range of the near-field light generated from an opening or a refraction index-changed area formed on the optically changeable layer 104'.

Referring to FIG. 7e, in a discrete track medium 74", there are formed of the under layer 101 and the intermediate layer 102 on the disk substrate 100, and on the intermediate layer 102, there is formed of a magnetic recording layer 103' having the form of ridge-shaped discrete tracks. The optically changeable layer 104 on the layer 103' does not have the form of physically separated tracks. This structure also makes it possible to form recording bits aligning both in the track width direction and the direction along track with high density on the magnetic recording layer 103'.

Hereinafter, a description will be given of the heat-assisted magnetic recording according to the present invention.

Figure 8A:
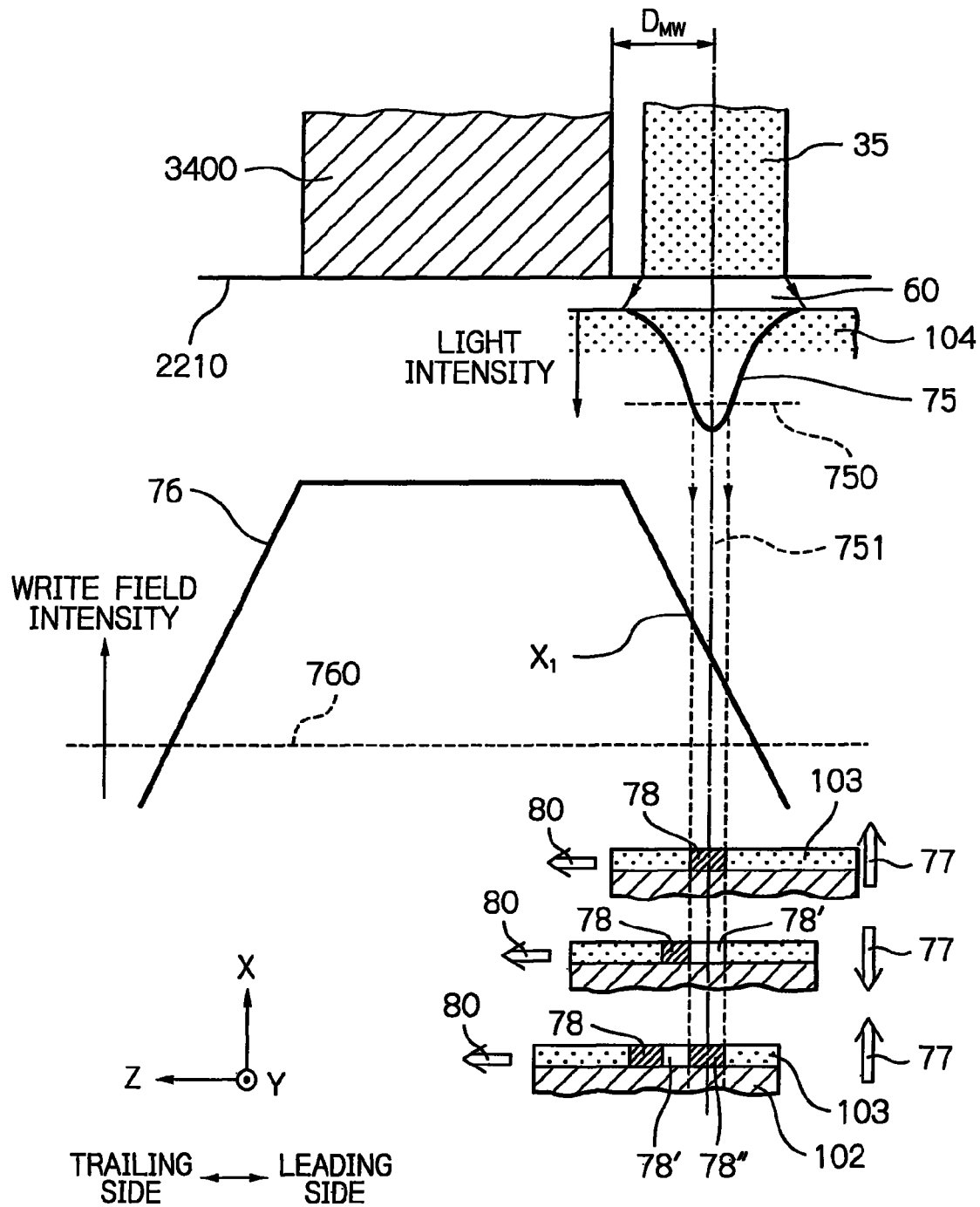
FIGS. 8a and 8b show schematic diagrams for explaining the heat-assisted magnetic recording performed in the magnetic recording apparatus according to the present invention.
Figure 8B:
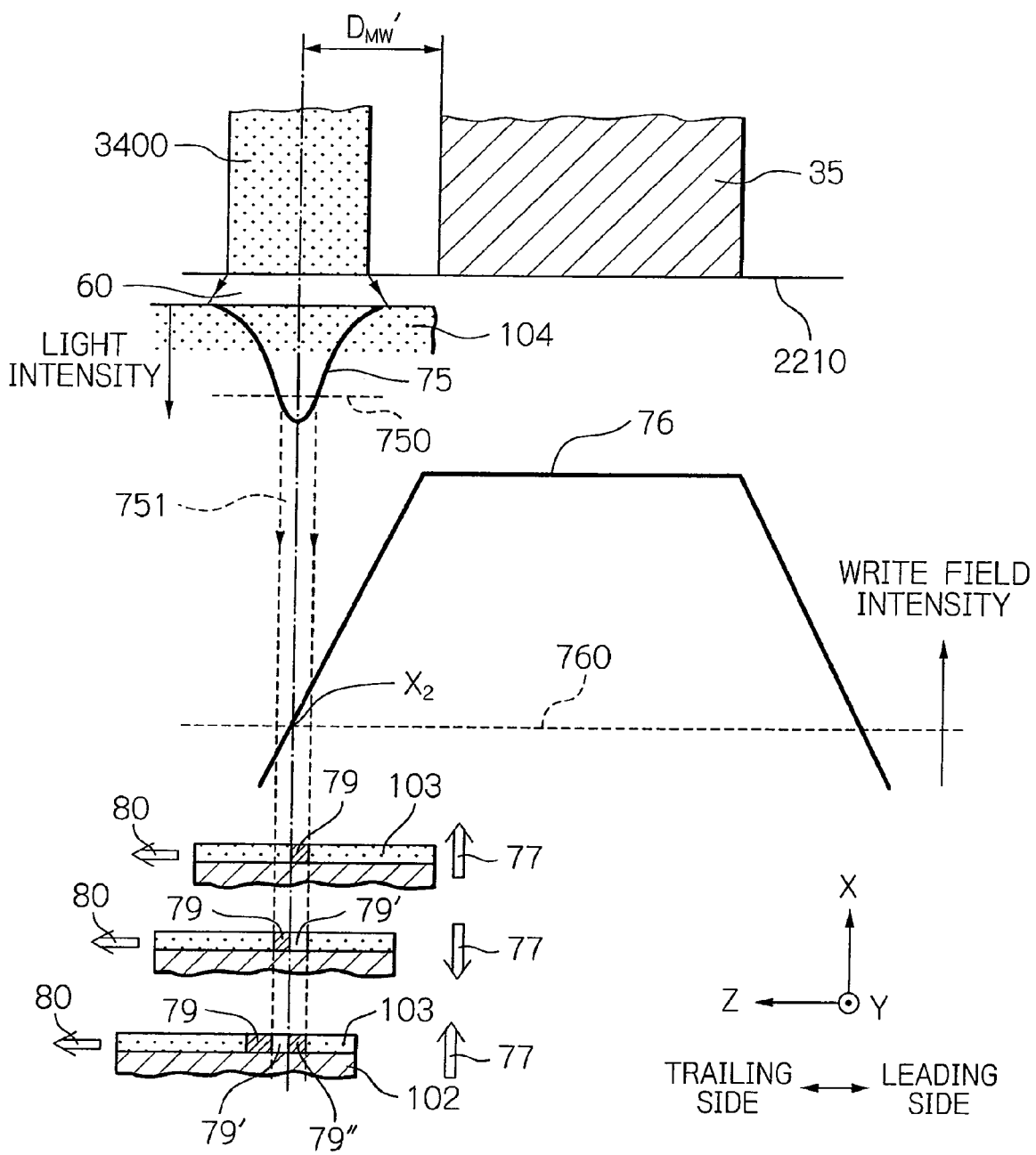

FIGS. 8a and 8b show schematic diagrams for explaining the heat-assisted magnetic recording performed in the magnetic recording apparatus according to the present invention. In FIG. 8a, the waveguide 35 is disposed at the leading side relative to the main magnetic pole 3400, but when the waveguide 35 is disposed at the trailing side relative to the main magnetic pole 3400, the same explanation as below can be given. FIG. 8b shows a case that the waveguide 35 is disposed at the trailing side relative to the main magnetic pole 3400.

The heat-assisted magnetic recording according to the present invention shown in FIG. 8a represents an optical dominant recording in the direction along track. The optically changeable layer 104 receives the laser light 60 radiated from the waveguide 35, and has a light intensity distribution 75 in the direction along track (Z-axis direction) within its own layer. In the intensity distribution, the laser light corresponding to a part of the intensity distribution exceeding a threshold value 750 of the light intensity can heat the irradiated portion to a temperature equal to or more than the transparency-making temperature or the threshold of the refractive-index change; thus, the laser light causes the portion to be made transparent or the refractive index to be changed. With this, near-field light 751, having a propagation-range size corresponding to the diameter of the part of the intensity distribution, irradiates the magnetic recording layer 103. On the other hand, the write field generated from the main magnetic pole 3400 generally represents a trapezoidal intensity distribution 76 in the direction along track (Z-axis direction). In this distribution, a threshold value 760 of the write field indicates the minimum intensity of the magnetic field with which writing can be performed (magnetization can be reversed) by applying the magnetic field to the portion on the magnetic recording layer 103 where the anisotropic magnetic field (coercive force) is lowered due to the temperature rise by receiving the near-field light 751.

In FIG. 8a, the distance $D_{MW}$ between the main magnetic pole 3400 and the center axis (passing through the spot center) of the waveguide 35 is set to a sufficiently small value. Resultantly, the write field whose value is equal to or more than the threshold value 760 is applied to the irradiated area of the near-field light 751 on the magnetic recording layer 103. With this, for example, when the write field is directed toward a direction shown by an arrow 77 (upward), a recording bit 78 is formed on the magnetic recording layer 103. As the magnetic disk moves toward a direction shown by an arrow 80, a recording bit 78' and further a recording bit 78" are sequentially formed every time the write field reverses. In this case, the position forming a magnetization transition area of the recording bits 78-78" is a position $X_1$ of the end at the trailing side (+Z direction side) in the irradiated area of the near-field light 751.

On the other hand, the heat-assisted magnetic recording according to the present invention shown in FIG. 8b represents a magnetic dominant recording in the direction along track. In this case, the waveguide 35 is disposed at the trailing side relative to the main magnetic pole 3400, and the distance $D_{MW}'$ between the main magnetic pole 3400 and the center axis (passing through the spot center) of the waveguide 35 is set to a predetermined value larger than the distance $D_{MW}$ shown in FIG. 8a. As a result, the write field has a threshold 760 at the vicinity of the center of the irradiated area of the near-field light 751 in the direction along track on the magnetic recording layer 103. With this, for example, when the write field is directed toward the direction shown by the arrow 77 (upward), a recording bit 79 is formed on the magnetic recording layer 103. As the magnetic disk moves toward the direction shown by the arrow 80, a recording bit 79' and further a recording bit 79" are sequentially formed every time the write field reverses. In this case, the position forming a magnetization transition area of the recording bits 79-79" is a position $X_2$ corresponding to the threshold 760 of the write field in the irradiated area of the near-field light 751.

As described above, in the heat-assisted magnetic recording according to the present invention, it is possible to select either the magnetic dominant recording or the optical dominant recording in the direction along track by adjusting the distance $D_{MW}$ between the main magnetic pole 3400 and the center axis of the waveguide 35. Next, it will be presented also in the heat-assisted magnetic recording according to the present invention that it is possible to achieve, for example, an optical dominant recording in the direction along track and the magnetic dominant recording in the track width direction by properly setting the shape and size of the light-exit end surface of the waveguide 35 in the head.

Figure 9A:
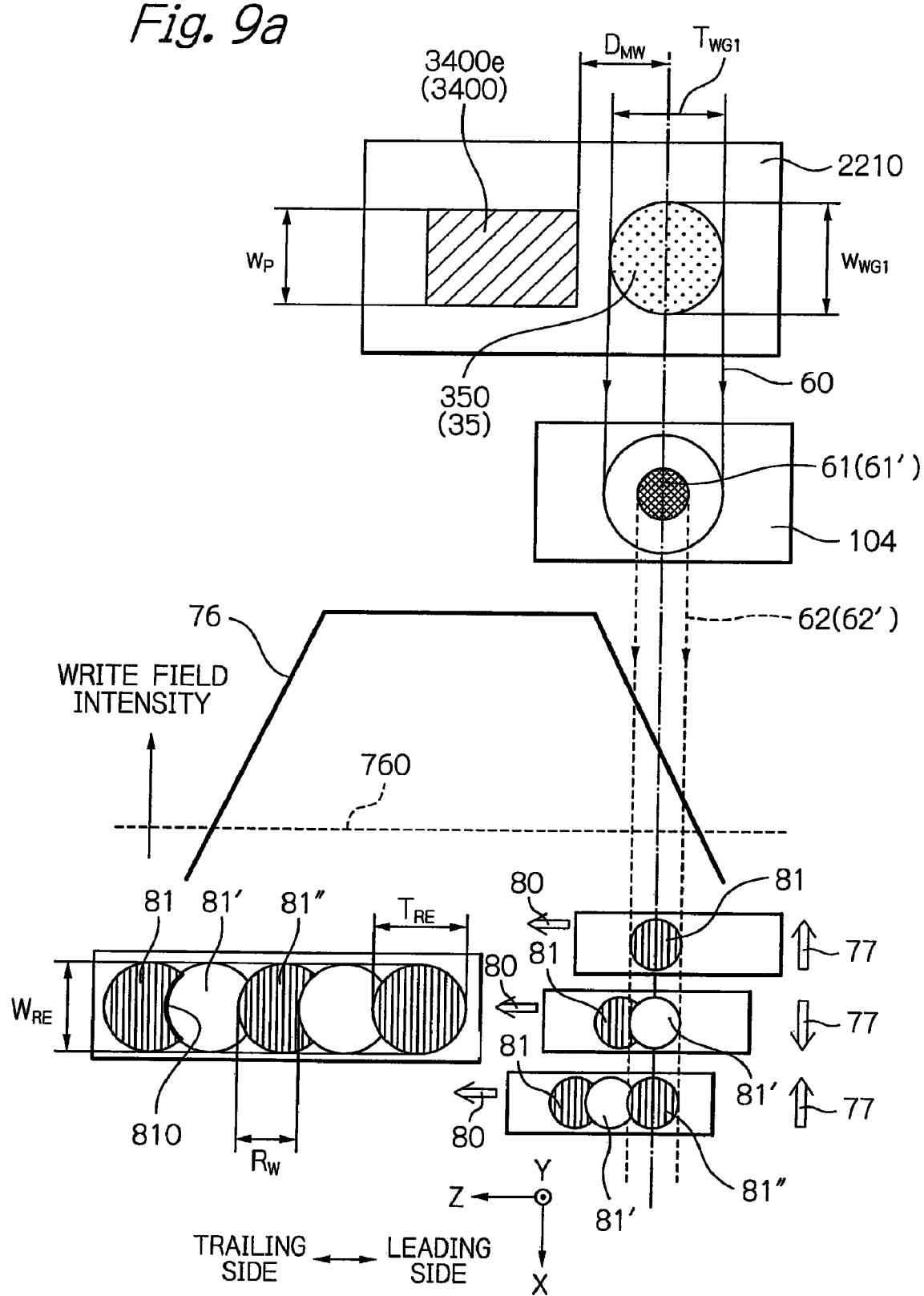
FIGS. 9a and 9b show schematic diagrams for explaining the case that there is performed an optical dominant recording in the direction along track and a magnetic dominant recording in the track width direction in the magnetic recording apparatus according to the present invention.
Figure 9B:
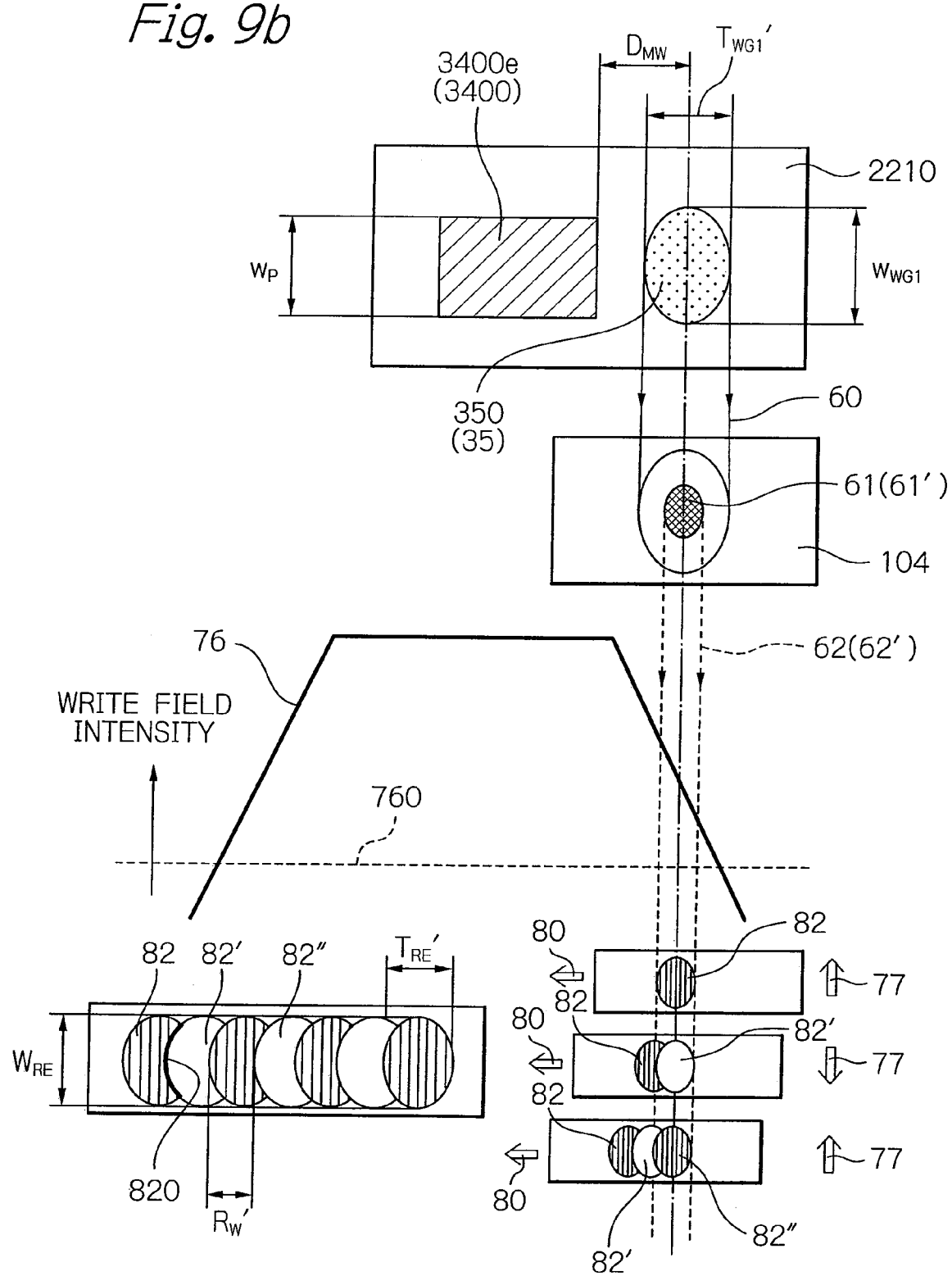

FIGS. 9a and 9b show schematic diagrams for explaining the case that there is performed an optical dominant recording in the direction along track and a magnetic dominant recording in the track width direction in the magnetic recording apparatus according to the present invention. Here, in both of the embodiments shown in FIGS. 9a and 9b, the optical dominant recording, which is the same recording operation as shown in FIG. 8a, is performed in the direction along track. In both of FIGS. 9a and 9b, the waveguide 35 is disposed at the leading side relative to the main magnetic pole 3400. However, even when the waveguide 35 is disposed at the trailing side relative to the main magnetic pole 3400, the same explanation as below can be given.

In the embodiment shown in FIG. 9a, the width $W_p$ in the track width direction (Y-axis direction) of the main magnetic pole 3400 on the head end surface 2210 and the width $W_{WG1}$ in the track width direction (Y-axis direction) on the end surface 350 of the waveguide 35 are determined so as to satisfy the conditions to be described below. First, the part 61 of the optically changeable layer 104 is made transparent or the refractive index of the part 61' is changed with irradiation of the laser light 60 radiated from the end surface 350 of the waveguide 35, near-field light 62 (62') generated from the part 61 (61') irradiates the magnetic recording layer 103, and the anisotropic magnetic field of the portion on the magnetic recording layer 103 is resultantly lowered. The width in the track width direction of the lowered portion is denoted by $W_{RE}$. The width $W_{RE}$ is to finally become equal to the width of recording bits 81-81" in the track width direction. Next, a width in the track width direction (Y-axis direction) on the magnetic recording layer 103 of an applied area of the write field having enough intensity to write onto the magnetic recording layer 103 is denoted by $W_{EFF}$. Then, the width $W_p$ of the main magnetic pole 3400 and the width $W_{WG1}$ on the end surface 350 of the waveguide 35 are determined so that the width $W_{RE}$ is equal to or more than the width $W_{EFF}$, that is, the relation of (width $W_{RE}$)≧(width $W_{EFF}$) is satisfied.

The length (thickness) $T_{WG1}$ on the end surface 350 in the direction along track (Z-axis direction) may be set to approximately equal to the width $W_{WG1}$. In this case, a length $T_{RE}$ in the direction along track (Z-axis direction) of initially-formed single bit of recording bits 81-81" on the magnetic recording layer 103 can be approximately equal to the width $W_{RE}$. In this case, the shape of the initially-formed single bit of the recording bits 81-81" becomes almost circular. With the setting described above, there can be achieved the optical dominant recording in the direction along track and the magnetic dominant recording in the track width direction.

On the other hand, also in the embodiment shown in FIG. 9b, the width $W_p$ of the main magnetic pole 3400 and the width $W_{WG1}$ on the end surface 350 of the waveguide 35 are determined so that the relation of (width $W_{RE}$)≧(width $W_{EFF}$) is satisfied, and there can be achieved the optical dominant recording in the direction along track and the magnetic dominant recording in the track width direction. However, in FIG. 9b, a length (thickness) $T_{WG1}'$ on the end surface 350 in the direction along track (Z-axis direction) is set to be a smaller value than the width $W_{WG1}$. In this case, a length $T_{RE}'$ in the direction along track (Z-axis direction) of initially-formed single bit of recording bits 82-82" on the magnetic recording layer 103 becomes also smaller than the width $W_{RE}$, by which the shape of the initially-formed single bit of the recording bits 82-82" can be an ellipsoid with a longer axis in the track width direction (Y-axis direction).

Here, in the embodiments shown in FIGS. 9a and 9b, the shapes, pitches and sizes of the recording bits formed on the magnetic recording layer 103 will be compared. Each of the recording bits 81-81" in FIG. 9a is almost circular when initially formed. Therefore, a magnetization transition area 810 as a boundary made when the recording bits 81-81" are aligned with partial overlap by a pitch $R_W$, also has a curvature corresponding to the arc of this circle. Incidentally, in case of magneto optical recording, when the pitch $R_W$ is smaller than the wavelength of laser light for reading, it is impossible to read out. On the contrary, when recording bits are magnetically read as in the present invention, even if the pitch $R_W$ is shorter than the wavelength of the laser light, it is possible to read the recording bits when the bits has been written with the pitch $R_W$ that is equal to or more than a pitch near the read gap of the MR element 33 (FIG. 3).

On the other hand, each of the recording bits 82-82" in FIG. 9b is elliptical-shaped with a longer axis in the track width direction (Y-axis direction) when initially formed. Therefore, a magnetization transition area 820 as a boundary made when the recording bits 82-82" are aligned with partial overlap, also has a curvature corresponding to this ellipsoid. The curvature of the magnetization transition area 820 is smaller than that of the magnetization transition area 810 (FIG. 9a). As a result, the recording bits 82-82" can be aligned closer to each other by a pitch $R_W'$ smaller than the pitch $R_W$. That is, in the embodiment of FIG. 9b, the linear recording density can be improved. When the curvature of the magnetization transition area 820 is made small enough to match the curvature of the MR multilayer 332 that is a magnetic field sensing part of the MR element 33 (FIG. 3), the area 820 becomes closer to a linear shape, to thereby get a much smaller pitch. Resultantly, it is possible to achieve secure read operation with much higher linear recording density.

For example, U.S. Pat. Nos. 6,226,258 B1, 6,741,549 B2, US Patent Publication No. 2006/0233060 A1, and Japanese Patent Publication No. 2002-117549A disclose recording media including a transmissivity-controlling layer, a mask layer, a reflection layer, and an optical material layer, respectively. However, all of these are for optical recording media, and a magnetic recording media in which optical properties are controlled has not been put into practice.

On the contrary, in the heat-assisted magnetic recording according to the present invention, the distance between the main magnetic pole 3400 and the magnetic recording layer 103 can be set to be much smaller compared to that of magneto optical recording, for example, can be set to be about 20 nm or less, and therefore the write field can be generated in the vicinity closer to the magnetic recording layer 103. As a result, it is facilitated to control the write-field intensity distribution, and it is possible to dealt with both recording types of the optical dominant recording and the magnetic dominant recording. Moreover, the write field generated from the main magnetic pole 3400 is not required to be so large, which can reduce the size of the electromagnetic transducer 34 and further reduce the inductance of the electromagnetic transducer 34, for example, to 5 nH or less. As a result, when the magnetic dominant recording is employed, there can be achieved recording with higher frequency (1 GHz or more) compared to the magneto optical recording (approximately 1 MHz), therefore the recording density can be improved.

Further, in the heat-assisted magnetic recording according to the present invention, the distance between the end surface 350 of the waveguide 35 and the magnetic recording layer 103 can be set to be much smaller compared to that of magneto optical recording, for example, set to be about 20 nm or less. Therefore, the laser light for assistance, as well as the write field, can be generated in the vicinity closer to the magnetic recording layer 103. Accordingly, it is possible to precisely control the light-intensity distribution as well as the write-field intensity distribution. With this, there can be individually selected either the optical dominant recording or the magnetic dominant recording in each of the direction along track and the track width direction. Resultantly, by selecting a favorable recording type according to the design specifications of the apparatus, higher recording density can be achieved.

Furthermore, in the heat-assisted magnetic recording according to the present invention, it is possible to precisely control the write-field intensity distribution and the light-intensity distribution on the surface of recording medium, which facilitates control of the shape of recording bits formed on the magnetic recording layer 103. As a result, reduction of noise and improvement of the recording density can be achieved.

Moreover, in magneto optical recording, reading can be performed using light. Therefore, when an optically interfering layer such as, for example, an opaque optically changeable layer exists above a magnetic recording layer, there is a possibility that accurate reading cannot be performed due to the influence of reflection, etc. On the contrary, in the heat-assisted magnetic recording according to the present invention, the magnetic field from a magnetic recording medium is directly read when reading data on the magnetic recording medium, therefore the reading is not seriously affected by the optically changeable layer 104.

Moreover, in the heat-assisted magnetic recording according to the present invention, the laser light for assistance can stably irradiate the surface of the recording medium without installing a complicated optical system on the head, compared to conventional heat-assisted magnetic recording. Actually, the thin-film magnetic head 21 has only a comparatively simple structure of having mainly the laser diode 40 and the waveguide 35 as an optical system for the heat-assisted magnetic recording. That is, the thin-film magnetic head 21 is not necessitated to install a near-field-light generating element, and does not require very high precision that is usually requested for an optical system to generate the desired near-field light. Moreover, the near-field light is generated within the magnetic recording medium, and therefore the irradiation area of the laser light for assistance can be relatively wide, and positional precision of irradiation is not requested to be so high. Accordingly, the optical system within the head can be simplified more easily.

Furthermore, in the heat-assisted magnetic recording according to the present invention, it is possible to control the generation area of the near-field light by adjusting the intensity of the laser light for assistance, compared to the conventional heat-assisted magnetic recording. Therefore, it is possible to set the width of recording bits in the track width direction to be narrower than the width of the recorded track area that generates magnetic field having an intensity not less than a predetermined intensity.

Moreover, the magnetic recording medium according to the present invention can be formed in its manufacturing process by adding a film-formation process for only one layer at the minimum, compared to conventional medium. Moreover, the optical system of the head can be simplified as described above, and therefore manufacturing yield can be improved as a whole magnetic recording apparatus, thereby reducing manufacturing cost.

Figure 10:
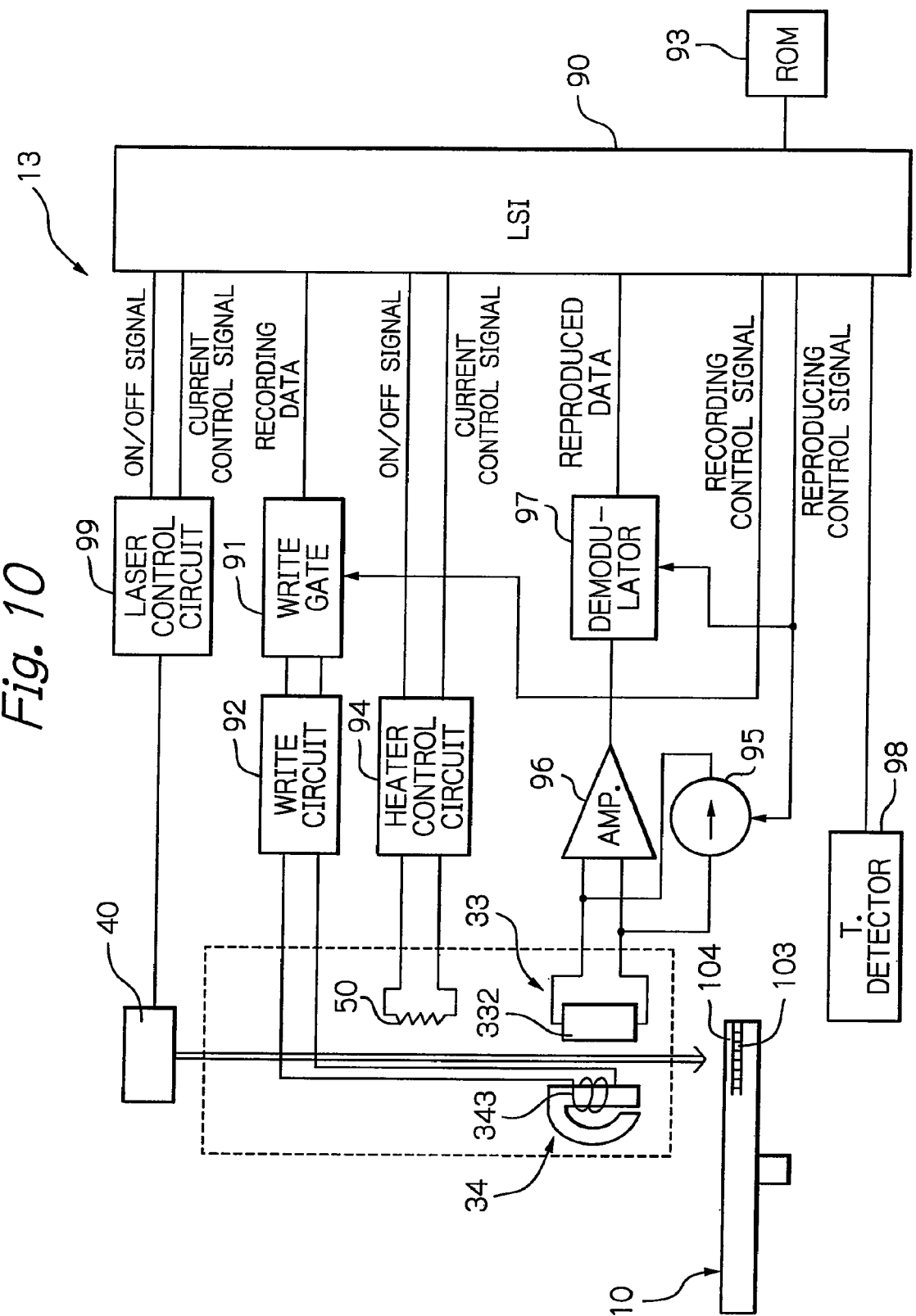
FIG. 10 shows a block diagram illustrating a circuit configuration of the recording/reproducing control circuit in the magnetic disk apparatus shown in FIG. 1.

FIG. 10 shows a block diagram illustrating a circuit configuration of the recording/reproducing control circuit 13 in the magnetic disk apparatus shown in FIG. 1.

In FIG. 10, reference numeral 90 indicates a control LSI, 91 a write gate for receiving recording data from the control LSI 90, 92 a write circuit, 93 a ROM that stores a control table and so on for controlling operation current supplied to the laser diode 40 and the heating element 50, 95 a constant current circuit for supplying sense current to the MR element 33, 96 an amplifier for amplifying the output voltage from the MR element 33, 97 a demodulator circuit for outputting reproduced data to the control LSI 90, 98 a temperature detector, 99 a laser control circuit for controlling the laser diode 40, and 94 a heater control circuit for controlling the heating element 50, respectively.

The recording data outputted from the control LSI 90 are supplied to the write gate 91. The write gate 91 supplies the recording data to the write circuit 92 only when a recording control signal outputted from the control LSI 90 instructs a write operation. The write circuit 92 applies write current through the write coil layer 343 according to the recording data, and the write field generated from the main magnetic pole 3400 writes the data on the magnetic disk.

Constant current flows from the constant current circuit 95 into the MR multilayer 332 only when a reproducing control signal outputted from the control LSI 90 instructs a read operation. The signal reproduced by this MR element 33 is amplified by the amplifier 96, demodulated by the demodulator circuit 97, and thus the obtained reproduced data are outputted to the control LSI 90.

The laser control circuit 99 receives a laser ON/OFF signal and a laser-operation control signal that are outputted from the control LSI 90. When the laser ON/OFF signal is an ON operation instruction, operation current equal to or more than an oscillation threshold value is applied to the laser diode 40. This current causes the laser diode 40 to radiate light. The laser light propagates through the waveguide 35, and reaches the optically changeable layer 104 of the magnetic disk 10. This causes the optically changeable layer 104 to generate the near-field light, which irradiates the magnetic recording layer 103 and heats the magnetic recording layer 103. The operation current value in this case is controlled to a value corresponding to the operation current control signal. The control LSI 90 generates the laser ON/OFF signals according to the timing of recording/reproducing operations, and determines the value of the operation current control signal based on the control table in the ROM 93, by taking into account the temperature of the magnetic recording layer 103 in the magnetic disk 10, the temperature measured by the temperature detector 98. Here, the control table may include data about the relationship between the operation current value and the amount of temperature increase of the magnetic recording layer 103 that has been heat-assisted, and data about the temperature dependency of the anisotropic magnetic field (coercive force) of the magnetic recording layer 103, as well as the temperature dependencies of the oscillation threshold and the light-output vs. operation-current characteristics. Thus, it is possible to realize not only simple current application to the laser diode 40 linked with the write operation but also more diversified current application modes by providing the system of the laser ON/OFF signal and operation current control signal independently from the recording/reproducing operation control signal system.

The heater control circuit 94 receives a heater ON/OFF signal and a heater current control signal from the LSI 90. When the heater ON/OFF signal is an ON operation instruction, current flows through the heating element 50. The current value in this case is controlled to a value corresponding to the heater current control signal. The LSI 90 determines the value of these heater ON/OFF signal and heater current control signal based on the control table in the ROM 93, by taking into account the state of recording/reproducing operation and the value of the temperature measured by the temperature detector 98. Thus, it is possible to realize not only current application to the heating element linked with the recording/reproducing operation but also more diversified current application modes by providing the system of the heater ON/OFF signal and heater current control signal independently from the recording/reproducing operation control signal system.

It is obvious that the circuit configuration of the recording/reproducing control circuit 13 is not limited to that shown in FIG. 10. It is also possible to control the write and read operations by using a signal other than a recording control signal and a reproducing control signal. Further, it is also possible that the laser control circuit 99 and/or the heater control circuit 94 are directly controlled by the recording control signal and the reproducing control signal.

EXAMPLES

Hereinafter, there are shown practical examples in which the heat-assisted magnetic recording was carried out by using magnetic recording media according to the present invention.

Figure 11A:
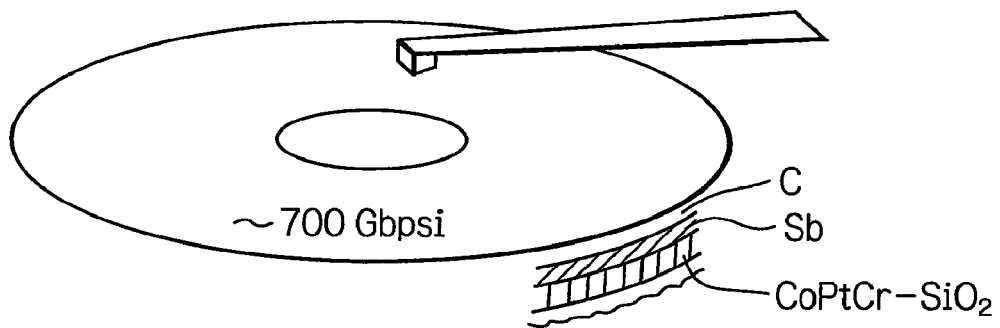
FIGS. 11a to 11c show schematic diagrams illustrating practical example 1, practical example 2 and a comparative example, respectively.
Figure 11B:
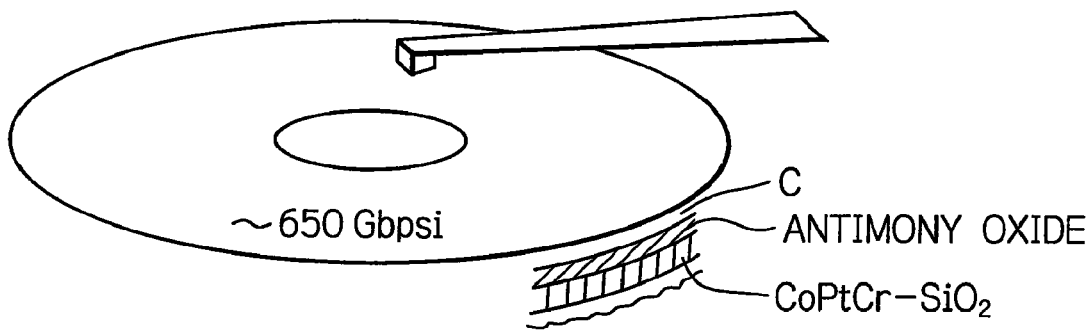
Figure 11C:
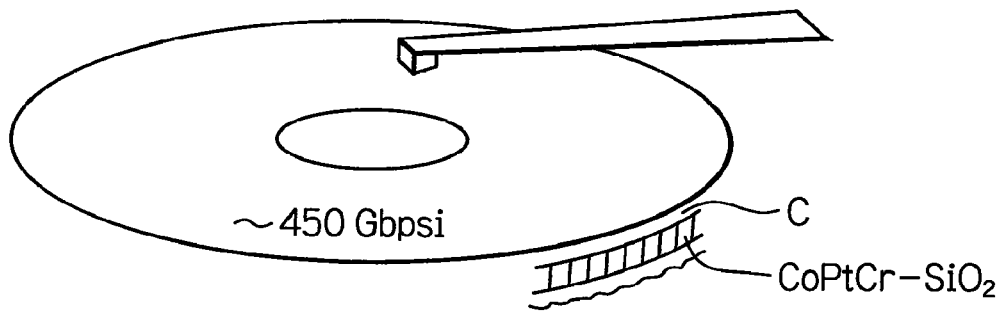

FIGS. 11*a* to 11*c* show schematic diagrams illustrating practical example 1, practical example 2 and a comparative example, respectively.

As shown in FIG. 11*a* as practical example 1, a magnetic recording layer was formed by using granular medium material of CoPtCr—SiO$_2$ type, and an optically changeable layer was formed of Sb (antimony) with thickness of 2 nm over the recording layer. Further, an overcoat layer was formed of C (carbon) with thickness of 0.5 nm over the optically changeable layer, thus a magnetic disk with a diameter of 2.5 inch was produced. The coercive force Hc of the magnetic recording layer was 5,500 Oe. As shown in FIG. 11*b* as practical example 2, a magnetic disk was formed similar to the practical example 1 with the exception that an optically changeable layer was made of antimony oxide with the thickness of 2 nm. Further, as shown in FIG. 11*c* as the comparative example, a magnetic disk was formed similar to the practical example 1 with the exception that the optically changeable layer was omitted.

As a head for writing and reading data, there was used such a head that includes an electromagnetic transducer with a recording track width of 70 nm, an MR element with a read track width of 40 nm, a waveguide having the size (width W$_{WG1}$×thickness T$_{WG1}$) of a light exit end surface by 500 nm×100 nm, a GaAs type laser diode with a wavelength $\lambda_L$ of 620 nm as a light source, and further a heat element for adjusting the flying height of the head. With use of this heat element, the flying height during reading and writing of data was controlled to 2 nm.

Reading and writing of data was performed using a tester of GuZik Technical Enterprises. A preamplifier that was used was Ager PA 7800 series'. The number of rotation of the magnetic disk was 7,400 rpm in any of the practical examples 1, 2 and comparative example, and the recording frequency was 1 GHz. The skew angle of the head was set to 6 degrees. Further, in any of the practical examples 1, 2 and comparative example, the laser light irradiated the magnetic disk from the head, and the electromagnetic transducer generated the write field to be applied to the magnetic disk for writing data. Reading of the written data was performed by using the MR element of the head. The recording method was the optical dominant recording in the direction along track and the magnetic dominant recording in the track width direction.

Table 1 shows the maximum recording density achieved in each of the practical examples 1 and 2 and comparative example. Here, the maximum recording density indicates a recording density in which reading was performed after writing with a certain recording density and the S/N ratio at the time was $10^{-6}$ or less. The unit of the recording density is the number of gigabits per square inch, namely, Gbpsi.

TABLE 1

|  | PRACTICAL EXAMPLE 1 | PRACTICAL EXAMPLE 2 | COMPARATIVE EXAMPLE |
|---|---|---|---|
| MAXIMUM RECORDING DENSITY | ABOUT 700 Gbpsi | ABOUT 650 Gbpsi | ABOUT 450 Gbpsi |

According to Table 1 and FIGS. 11*a* to 11*c*, in the practical examples 1 and 2 in which the heat-assisted magnetic recording was performed by utilizing the optically changeable layer, much higher maximum recording density over 600 Gbpsi was achieved compared to the comparative example using a conventional medium that did not have the optically changeable layer. From the result, it is understood that, according to the heat-assisted magnetic recording using a magnetic recording medium of the present invention, much higher recording density can be achieved while showing a good S/N ratio.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:
1. A magnetic recording apparatus comprising
at least one magnetic recording medium; and
at least one thin-film magnetic head for writing data in said at least one magnetic recording medium, the magnetic recording medium comprising:

a magnetic recording layer formed over a layer-stacked surface of a substrate; and at least one optically changeable layer formed on a side opposite to said substrate relative to said magnetic recording layer; said at least one optically changeable layer being made transparent due to irradiation of light, the thin-film magnetic head comprising:

a write head element comprising a magnetic pole for generating write magnetic field applied to said magnetic recording layer to write data; and a waveguide for guiding light to said at least one optically changeable layer, and a light source for supplying light to said waveguide, provided in one of the thin-film magnetic head and within said magnetic recording apparatus, a part of the optically changeable layer being made transparent with irradiation of the light emitted from a light-exit end surface, which is opposed to the magnetic recording medium, of said waveguide; near-field light generated from the part irradiating said magnetic recording layer so that an anisotropic magnetic field of a portion on said magnetic recording layer is lowered to a writable value; and a width in the track width direction of the lowered portion is equal to or more than a width in the track width direction, on said magnetic recording layer, of an applied area of write magnetic field generated from said magnetic pole and having enough intensity to write onto said magnetic recording layer.

2. The magnetic recording apparatus as claimed in claim 1, wherein a relative position between a spot center on the light-exit end surface, which is opposed to the magnetic recording medium, of said waveguide and an end surface, which is opposed to the magnetic recording medium, of said magnetic pole, and a shape and size of the light-exit end surface are set so that, with respect to a recording method to the magnetic recording layer, an optical dominant recording is performed in a direction along track and a magnetic dominant recording is performed in a track width direction.

3. The magnetic recording apparatus as claimed in claim 2, wherein the light-exit end surface, which is opposed to the magnetic recording medium, of said waveguide has an ellipsoid shape with a longer axis in the track width direction.

4. A magnetic recording apparatus comprising:
at least one magnetic recording medium; and
at least one thin-film magnetic head for writing data in said at least one magnetic recording medium,
the magnetic recording medium comprising:
a magnetic recording layer formed over a layer-stacked surface of a substrate; and
at least one optically changeable layer formed on a side opposite to said substrate relative to said magnetic recording layer, a refractive index of said at least one optically changeable layer being changed due to irradiation of light,
the thin-film magnetic head comprising:
a write head element comprising a magnetic pole for generating write magnetic field applied to said magnetic recording layer to write data; and
a waveguide for guiding light to said at least one optically changeable layer, and
a light source for supplying light to said waveguide, provided in one of the thin-film magnetic head and within said magnetic recording apparatus,
a refractive index of a part of the optically changeable layer being changed with irradiation of the light emitted from a light-exit and surface, which is opposed to the magnetic recording medium, of said waveguide; near-field light generated from the part irradiating said magnetic recording layer so that an anisotropic magnetic field of a portion on said magnetic recording layer is lowered to a writable value; and a width in the track width direction of the lowered portion is equal to or more than a width in the track width direction, on said magnetic recording layer, of an applied area of write magnetic field generated from said magnetic pole and having enough intensity to write onto said magnetic recording layer.

5. The magnetic recording apparatus as claimed in claim 4, wherein a relative position between a spot center on the light-exit end surface, which is opposed to the magnetic recording medium, of said waveguide and an end surface, which is opposed to the magnetic recording medium, of said magnetic pole, and a shape and size of the light-exit end surface are set so that, with respect to a recording method to the magnetic recording layer, an optical dominant recording is performed in a direction along track and a magnetic dominant recording is performed in a track width direction.

6. The magnetic recording apparatus as claimed in claim 5, wherein the light-exit end surface, which is opposed to the magnetic recording medium, of said waveguide has an ellipsoid shape with a longer axis in the track width direction.

* * * * *